US011442689B2

(12) United States Patent
Triplett et al.

(10) Patent No.: US 11,442,689 B2
(45) Date of Patent: *Sep. 13, 2022

(54) DYNAMIC BONDING OF PLAYBACK DEVICES

(71) Applicant: Sonos, Inc., Santa Barbara, CA (US)

(72) Inventors: Mark Triplett, St. Charles, IL (US); Steven Beckhardt, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/827,362

(22) Filed: Mar. 23, 2020

(65) Prior Publication Data
US 2020/0326906 A1    Oct. 15, 2020

Related U.S. Application Data

(63) Continuation of application No. 15/865,046, filed on Jan. 8, 2018, now Pat. No. 10,599,385, which is a
(Continued)

(51) Int. Cl.
*G06F 17/00* (2019.01)
*G06F 3/16* (2006.01)
(Continued)

(52) U.S. Cl.
CPC ............. *G06F 3/165* (2013.01); *H04R 3/12* (2013.01); *H04R 27/00* (2013.01); *G11B 27/34* (2013.01);
(Continued)

(58) Field of Classification Search
CPC .. G06F 3/165; H04R 3/04; H04R 3/12; H04R 27/00; H04R 2420/01; H04R 2430/01; H04R 2227/005; G11B 27/34
(Continued)

(56) References Cited

U.S. PATENT DOCUMENTS 5,440,644 A    8/1995  Farinelli et al.
5,761,320 A    6/1998  Farinelli et al.
(Continued)

FOREIGN PATENT DOCUMENTS

EP    1389853 A1    2/2004
WO    200153994     7/2001
(Continued)

OTHER PUBLICATIONS

AudioTron Quick Start Guide, Version 1.0, Mar. 2001, 24 pages.
(Continued)

*Primary Examiner* — Paul C McCord

(57) ABSTRACT

Examples of dynamic bonding of playback devices are disclosed. A disclosed example first playback device includes a shared device identifier to determine that a second playback device is sharable between a first bonded zone and a second bonded zone, the first bonded zone comprising the first playback device, the second bonded zone comprising a second playback device; a device manager to cause the shared playback device to join the first bonded zone; and an adjuster to change a first audio parameter of the first playback device in accordance with the joining of the shared playback device in the first bonded zone, wherein at least one of the shared device identifier, the device manager, or the adjuster is implemented via a processor.

20 Claims, 11 Drawing Sheets

Related U.S. Application Data continuation of application No. 14/731,119, filed on Jun. 4, 2015, now Pat. No. 9,864,571.

(51) Int. Cl.
*H04R 3/12* (2006.01)
*H04R 27/00* (2006.01)
*G11B 27/34* (2006.01)
*H04R 3/04* (2006.01)

(52) U.S. Cl.
CPC .......... *H04R 3/04* (2013.01); *H04R 2227/005* (2013.01); *H04R 2420/01* (2013.01); *H04R 2430/01* (2013.01)

(58) Field of Classification Search
USPC .......................................................... 700/94
See application file for complete search history.

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,256,554 B1 | 7/2001 | Dilorenzo |
| 6,404,811 B1 | 6/2002 | Cvetko et al. |
| 6,469,633 B1 | 10/2002 | Wachter et al. |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang et al. |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | Mccarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | Mcaulay et al. |
| 7,853,341 B2 | 12/2010 | Mccarty et al. |
| 7,921,369 B2 | 4/2011 | Bill |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | Mccarty et al. |
| 8,234,395 B2 | 7/2012 | Millington |
| 8,483,853 B1 | 7/2013 | Lambourne |
| 8,799,080 B2 | 8/2014 | D'Ambrosio et al. |
| 8,843,500 B2 | 9/2014 | Nogues et al. |
| 8,903,526 B2 | 12/2014 | Beckhardt et al. |
| 8,942,252 B2 | 1/2015 | Balassanian et al. |
| 9,246,866 B1 | 1/2016 | Sanders |
| 9,319,153 B2 * | 4/2016 | Bates ............... H04N 21/41407 |
| 9,330,096 B1 | 5/2016 | Fullerton et al. |
| 9,916,126 B2 | 3/2018 | Lang |
| 10,028,028 B2 | 7/2018 | Kumar |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0072816 A1 | 6/2002 | Shdema et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2007/0142944 A1 | 6/2007 | Goldberg et al. |
| 2008/0152312 A1 | 6/2008 | Levy et al. |
| 2009/0076881 A1 | 3/2009 | Svendsen |
| 2009/0179867 A1 | 7/2009 | Shim et al. |
| 2009/0234476 A1 | 9/2009 | Yoshida |
| 2010/0017714 A1 | 1/2010 | Agarwal et al. |
| 2010/0325239 A1 | 12/2010 | Khedouri et al. |
| 2012/0054278 A1 | 3/2012 | Taleb et al. |
| 2013/0243199 A1 | 9/2013 | Kallai et al. |
| 2013/0317635 A1 | 11/2013 | Bates et al. |
| 2013/0331970 A1 | 12/2013 | Beckhardt et al. |
| 2013/0339397 A1 | 12/2013 | Herasymchuk |
| 2014/0093085 A1 | 4/2014 | Jarvis et al. |
| 2014/0093096 A1 | 4/2014 | Sheen et al. |
| 2014/0122590 A1 | 5/2014 | Svendsen et al. |
| 2014/0146970 A1 | 5/2014 | Kim et al. |
| 2014/0230015 A1 | 8/2014 | Pollock |
| 2014/0310058 A1 | 10/2014 | Aral et al. |
| 2015/0179227 A1 | 6/2015 | Russell |
| 2015/0186110 A1 | 7/2015 | Kannan |
| 2015/0237409 A1 | 8/2015 | Harper et al. |
| 2015/0245138 A1 | 8/2015 | Bender et al. |
| 2015/0286360 A1 | 10/2015 | Wachter |
| 2016/0180248 A1 | 6/2016 | Regan |

FOREIGN PATENT DOCUMENTS

| | | |
|---|---|---|
| WO | 2003093950 A2 | 11/2003 |
| WO | 2009149019 A2 | 12/2009 |
| WO | 2012137190 A1 | 10/2012 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Dec. 10, 2019, issued in connection with European Application No. 19192260.8, 12 pages.
European Patent Office, Office Action dated Nov. 21, 2018, issued in connection with European Application No. 16729415.6, 7 pages.
Final Office Action dated Aug. 14, 2019, issued in connection with U.S. Appl. No. 15/865,046, filed Jan. 8, 2018, 15 pages.
International Bureau, International Preliminary Report on Patentability and Written Opinion, dated Dec. 14, 2017, issued in connection with International Application No. PCT/US2016/033777, filed on May 23, 2016, 10 pages.
International Searching Authority, International Search Report and Written Opinion dated Aug. 29, 2016, issued in connection with International Application No. PCT/US2016/033777, filed on May 23, 2016, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Nov. 14, 2016, issued in connection with U.S. Appl. No. 14/731,119, filed Jun. 4, 2015, 19 pages.
Non-Final Office Action dated Feb. 7, 2019, issued in connection with U.S. Appl. No. 15/865,046, filed Jan. 8, 2018, 14 pages.
Notice of Allowance dated Nov. 8, 2019, issued in connection with U.S. Appl. No. 15/865,046, filed Jan. 8, 2018, 8 pages.
Notice of Allowance dated Sep. 13, 2017, issued in connection with U.S. Appl. No. 14/731,119, filed Jun. 4, 2015, 5 pages.
Notice of Allowance dated Mar. 27, 2017, issued in connection with U.S. Appl. No. 14/731,119, filed Jun. 4, 2015, 5 pages.
Palm, Inc., "Handbook for the Palm VII Handheld," May 2000, 311 pages.
Presentations at WinHEC 2000, May 2000, 138 pages.

(56) References Cited

OTHER PUBLICATIONS

U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

DYNAMIC BONDING OF PLAYBACK DEVICES

CROSS-REFERENCE TO RELATED APPLICATIONS

This application claims the benefit of priority as a continuation under 35 U.S.C. § 120 to U.S. application Ser. No. 15/865,046 filed on Jan. 8, 2018 and entitled "Dynamic Bonding of Playback Devices", which is a continuation of U.S. application Ser. No. 14/731,119, now U.S. Pat. No. 9,864,571, filed on Jun. 4, 2015 and entitled "Dynamic Bonding of Playback Devices", the contents of each of which are hereby incorporated by reference in their entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
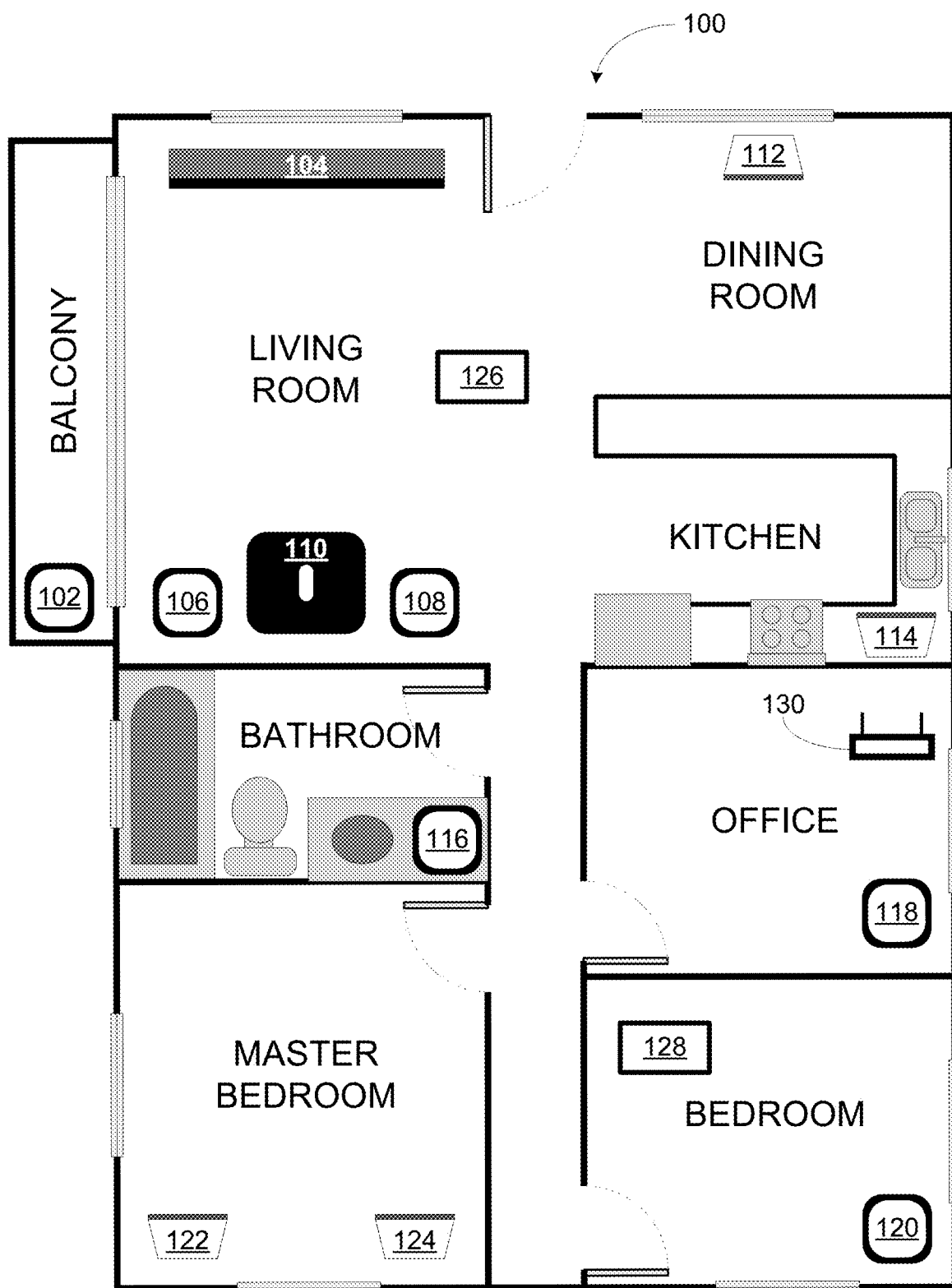
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Examples disclosed herein recognize that media playback systems are sometimes deployed in acoustically coupled areas. For example, a first room including first playback device(s) may be acoustically coupled with a second room including second playback device(s). The rooms are said to be acoustically coupled when audio playing in the first room is significantly audible in the second room such as in floors having an open floor plan. Put another way, rooms are said to be acoustically coupled when the first playback device(s) of the first room may at times present the same audio as the second playback device(s) of the second room at a same time.

As described below, playback devices of an area can be grouped together to form, for example, a bonded zone. To continue the above example scenario, a first bonded zone including the first playback device(s) may be implemented in the first room, and a second bonded zone including the second playback device(s) may be implemented in the second room. Examples disclosed herein enable playback devices to dynamically join and unjoin bonded zones. For instance, examples disclosed herein enable a particular playback device to be active in the first bonded zone of the first room at a first time and inactive in the first bonded zone of the first room at a second time different than the first time. Moreover, examples disclosed herein enable the playback device to be active in the second bonded zone of the second room when, for example, the playback device is inactive in the first bonded zone at the second time. Put another way, examples disclosed herein provide sharable playback devices that can dynamically switch from belonging to the first bonded zone to belonging to the second bonded zone.

In some examples, the sharable playback device is a subwoofer located in the first room of the above example, which is acoustically coupled to the second room, and examples disclosed herein enable the subwoofer to be part of the first bonded zone in certain circumstance(s) (e.g., when audio is being presented in the first room and not the second room) and a part of the second bonded zone in other circumstance(s) (e.g., when audio is being presented in the second room and not the first room). Thus, examples disclosed herein enable one or more playback devices to contribute to an audio presentation in different areas (e.g., bonded zones) depending on which area requires the capabilities of the playback devices at a given time. Notably, examples disclosed herein enable the playback device(s) to do so without necessarily being physically relocated (e.g., moved between the different areas).

Additionally, some examples disclosed herein adjust one or more aspects of playback configurations based on the bonded zone to which the shared playback device currently belongs. In some disclosed examples, when the dynamically shared playback device belongs to the first bonded zone, the playback configuration of each playback device in the first bonded zone, including the shared playback device, is different than the respective playback configurations when the dynamically shared playback device does not belong to the first bonded zone. In some disclosed examples, the playback configuration of the shared playback device is different when joined to the first bonded zone compared to when the shared playback device is joined to the second bonded zone.

Examples disclosed herein include a non-transitory computer readable memory having stored thereon instructions executable by a computing device to cause the computing device to perform operations. The example operations include determining that a first playback device is a member of a first bonded zone, the first bonded zone comprising a second playback device. The example operations further include determining that the first playback device is available to be shared between the first bonded zone and a second bonded zone, the second bonded zone comprising a third playback device, the second bonded zone not comprising the second playback device, the first bonded zone not comprising the third playback device. The example operations further include sending a message to the third playback device informing the third playback device that the first playback device is added to the second bonded zone.

An example method disclosed herein includes determining that a first playback device is a member of a first bonded zone, the first bonded zone comprising a second playback device. The example method disclosed herein further includes determining that the first playback device is available to be shared between the first bonded zone and a second bonded zone, the second bonded zone comprising a third playback device, the second bonded zone not comprising the second playback device, the first bonded zone not comprising the third playback device. The example method disclosed herein further includes sending a message to the third playback device informing the third playback device that the first playback device is added to the second bonded zone.

An example first playback device disclosed herein includes a sharable device identifier to determine that a second playback device is dynamically sharable between a first bonded zone and a second bonded zone, the first bonded zone comprising the first playback device, the second bonded zone comprising a second playback device. The example first playback device disclosed herein further includes a device manager to cause the shared playback device to join the first bonded zone. The example first playback device disclosed herein further includes an adjuster to change a first audio parameter of the first playback device in accordance with the joining of the shared playback device in the first bonded zone, wherein at least one of the sharable device identifier, the device manager, or the adjuster is implemented via a processor.

While some examples described herein may refer to functions or operations performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
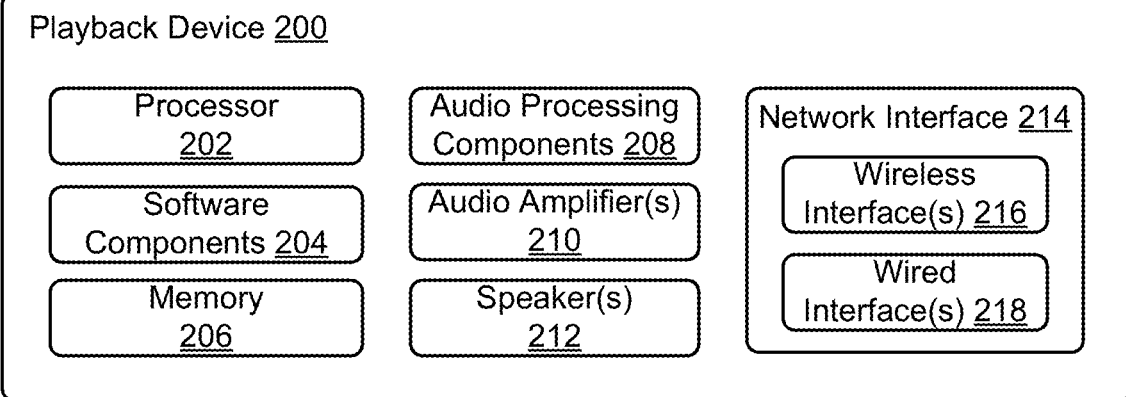
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

Paired playback devices are referred to as "bonded playback devices." Additionally, playback devices that are sonically consolidated to form a single, consolidated playback device are referred to as "bonded playback devices." Thus, a playback device is said to be bonded when a playback configuration of the playback device depends on the playback device being bonded with one or more other playback devices. Put another way, a playback device is said to bonded when one or more playback parameters and/or values of the playback device are set according to the playback device being joined with one or more other playback devices, rather than presenting media in a standalone manner (e.g., presenting all components of audio content). As described further below, two or more bonded playback devices are said to form a "bonded zone." By way of illustration, SONOS, Inc. presently offers (or has offered) for sale certain playback devices including a "PLAY:1," "PLAY: 3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. Some playback zones are "bonded zones." Two or more bonded playback devices are said to form a "bonded zone." For example, paired playback devices form a "bonded zone." Additionally, playback devices consolidated so as to be treated as a single playback device form a "bonded zone." As used herein, a "bonded zone" is distinguished from a "non-bonded zone." Specifically, a playback zone that is a "bonded zone" includes playback devices having playback configurations (e.g., audio playback settings) dependent on membership in the "bonded zone." In some cases, the playback configurations of playback devices in a bonded zone work together to form an audio presentation, with each of the playback devices contributing a subset of a full spectrum of the content. In turn, in some cases, a non-bonded zone includes playback devices that are presenting media in synchrony, but independently with respect to the playback configurations of the respective playback devices. That is, the playback configurations of playback devices in a non-bonded zone may be configured as though the playback devices are ungrouped, with each of the playback devices presenting the full spectrum of the content.

The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more paired devices, as one or more consolidated playback devices, or any combination thereof. Similarly, in the case of the master bedroom, playback devices 122 and 124 may be configured to play audio content in synchrony as individual playback devices, as paired devices, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
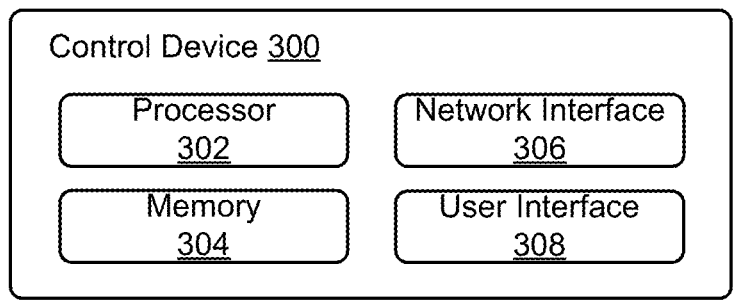
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded zone (e.g., paired devices or a consolidated player), separating one or more playback devices from a bonded zone, among others. Accordingly, the control device 300 may sometimes be referred to as a controller, whether the control device 300 is a dedicated controller or a network device on which media playback system controller application software is installed.

Figure 4:
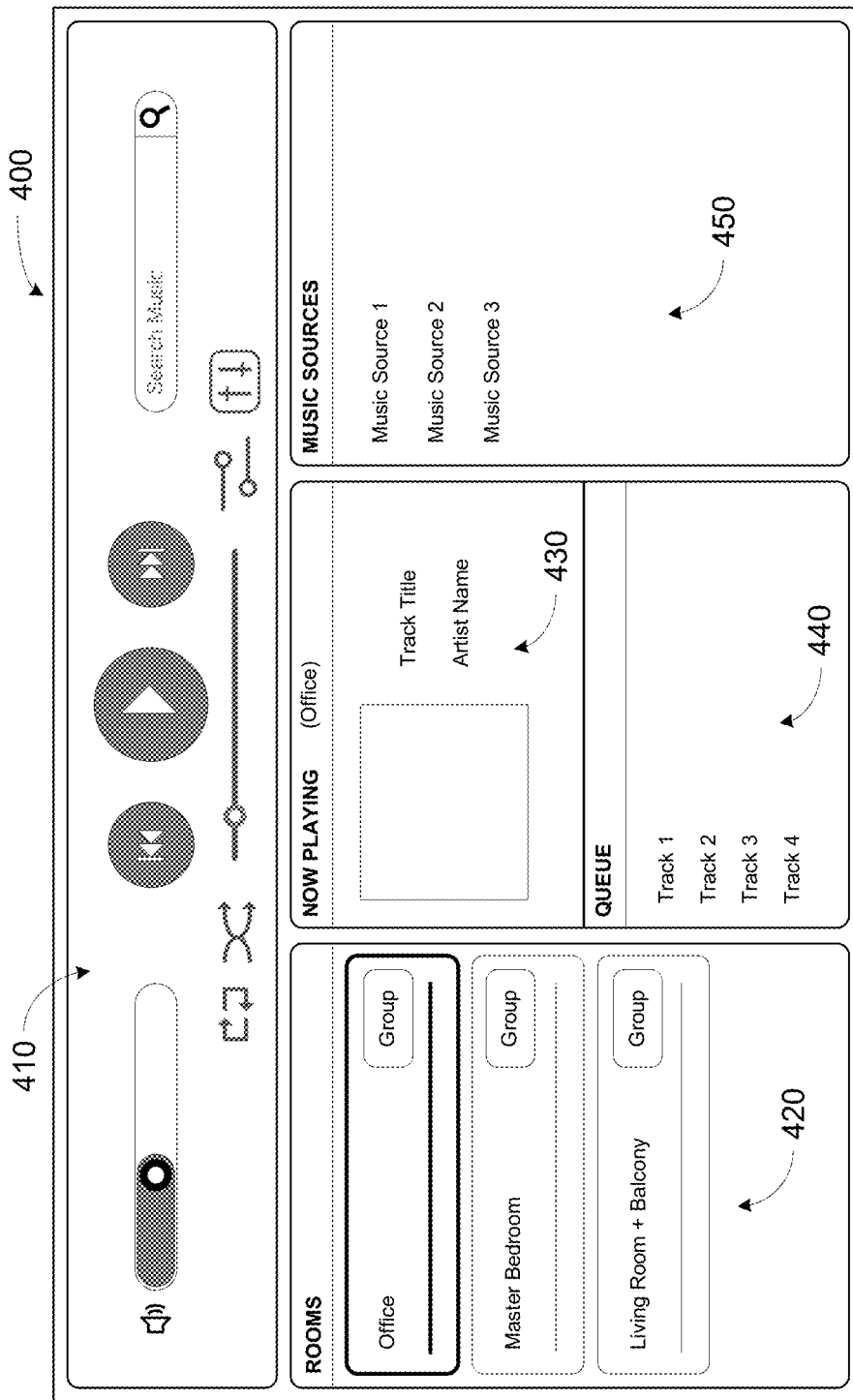
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods and Apparatus for Dynamic Bonding of Playback Devices

Figure 5:
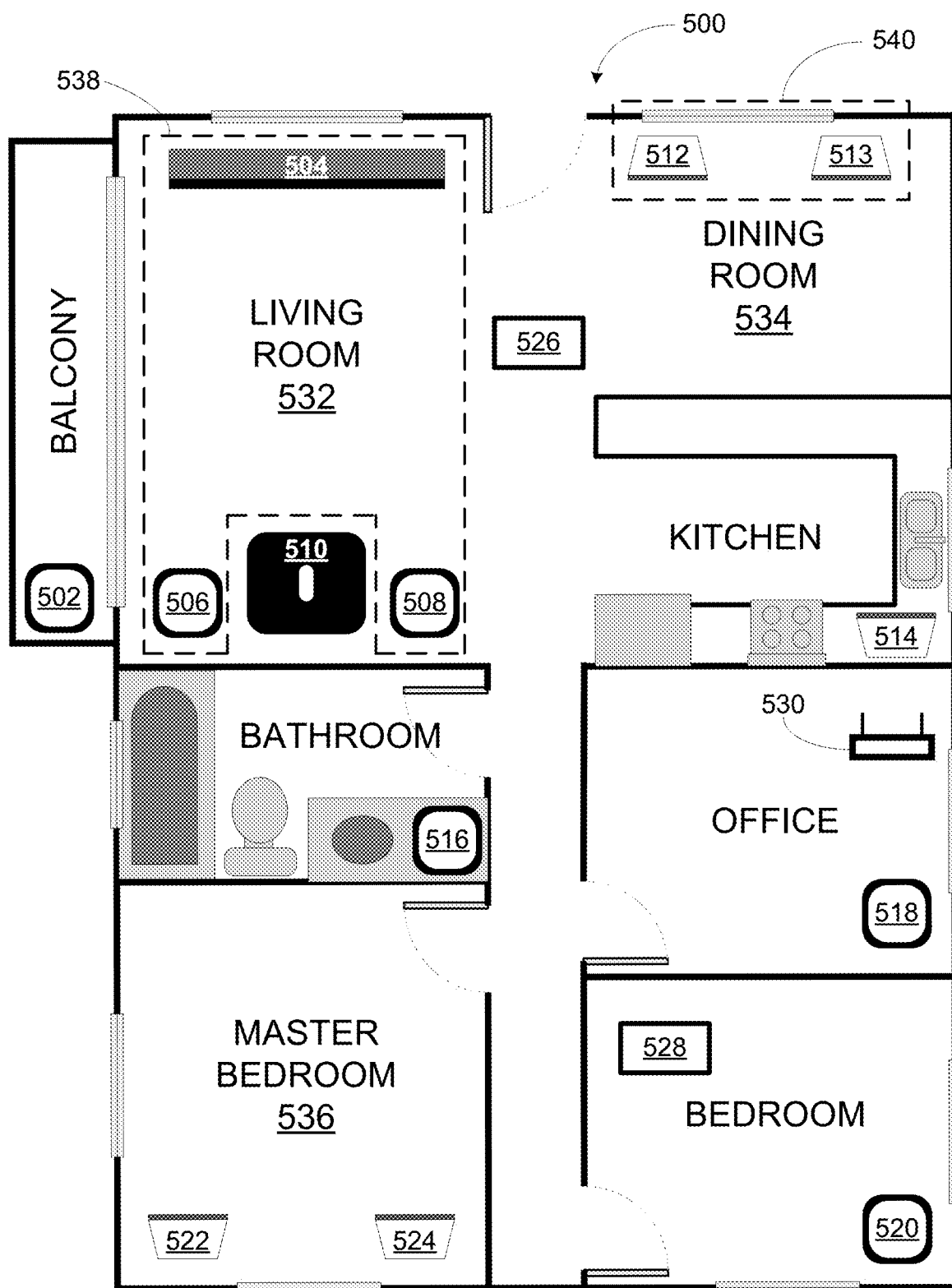
FIG. 5 shows an example media playback system configuration including a shared playback device that is dynamically sharable between bonded zones.

FIG. 5 illustrates an example media playback system 500 in which examples disclosed herein may be implemented. The example media playback system 500 of Figure includes playback devices 502-524, a first controller 526, a second controller 528, and a network router 530. The example media playback system 500 of FIG. 5 is deployed in an environment including a living room 532, a dining room 534, a master bedroom 536, and other areas. In the example of FIG. 5, the living room 532 and the dining room 534 are acoustically coupled because audio presented in the living room 532 is likely audible in the dining room 534 and audio presented in the dining room 534 is likely audible in the living room 532. In contrast, the living room 532 and the master bedroom 536 are not acoustically coupled because audio presented in the living room 532 is not likely audible in the master bedroom 536.

As discussed above, examples disclosed herein provide dynamically sharable playback devices capable of joining different bonded zones. In the example of FIG. 5, the playback devices labeled with reference numerals 504-508 form a first bonded zone 538. In the example of FIG. 5, the playback devices labeled with reference numerals 512 and 513 form a second bonded zone 540. The formations of the first and second bonded zones 538, 540 are achieved via, for example, one or more settings and/or selections made by a user. Additionally or alternatively, the playback devices 502-524 may be configured to automatically form the first and second bonded zones 538, 540 based on, for example, proximity of the respective playback devices to each other and/or based on the type of the respective playback devices. For example, when two PLAY:1 devices detect each other within a threshold distance (e.g., using wireless signal strength), the PLAY:1 devices may automatically form a bonded zone.

In the example of FIG. 5, the playback device labeled with reference numeral 510 is designated as a dynamically shared playback device capable of dynamically joining and unjoining the first bonded zone 538, and capable of dynamically joining and unjoining the second bonded zone 540. In the example of FIG. 5, the shared playback device 510 is a subwoofer. However, the shared playback device 510 can be any type of playback device. Additionally, any of the playback devices 502-524 of the media playback system 500 can be designated as a shared playback device by, for example, a user via the first controller 526 and/or the second controller 528. The shared playback device 510 is said to be "active" in a bonded zone when the shared playback device 510 is a member of that bonded zone. The shared playback device 510 is said to be "inactive" in a bonded zone when the shared playback device 510 is not a member of that bonded zone.

As disclosed in detail below, the example shared playback device 510 of FIG. 5 joins the first bonded zone 538 and/or the second bonded zone 540 depending on, for example, circumstances of audio playback in the living room 532 and/or the dining room 534. For example, when the first bonded zone 538 of the living room 532 is presenting audio and the second bonded zone 540 of the dining room 534 is not presenting audio, the shared playback device 510 joins or remains active in the first bonded zone 538. Additionally, in the illustrated example, when the first bonded zone 538 is not presenting audio and the second bonded zone 540 is presenting audio, the shared playback device 510 joins or remains active in the second bonded zone 540. Additionally, in the illustrated example, when the first bonded zone 538 and the second bonded zone 540 are simultaneously presenting the same audio, the shared playback device 510 remains active in its current one of the first and second bonded zones 538, 540, joins a preferred one of the first and second bonded zones 538, 540, or joins both of the first and second bonded zones 538, 540. Additionally, in the illustrated example, when the first bonded zone 538 and the second bonded zone 540 are simultaneously presenting different audio, the shared playback device 510 remain active in its current one of the first and second bonded zones 538, 540 or joins a preferred one of the first and second bonded zones 538, 540. In some examples, the simultaneous presentation of different audio in the first and second bonded zones 538, 540 is prevented and, thus, the shared playback device 510 does not encounter such a scenario.

As discussed above, individual playback devices of a bonded zone can cooperate with each other to present a full spectrum of audio content as a whole. That is, the individual playback devices of a bonded zone may present a subset of the full spectrum, as opposed to each playback device presenting the full spectrum of the audio content in synchrony. In the example of FIG. 5, the membership or component makeup of the first bonded zone 538 and the membership or component makeup of the second bonded zone 540 change when the shared playback device 510 switches between the first and second bonded zones 538, 540.

Examples disclosed herein adjust the audio configuration (e.g., playback settings) of the playback devices in response to the change in membership caused by the joining or unjoining of the shared playback device 510 in the first and/or second bonded zones 538, 540. For example, when the shared playback device 510 changes from being active in the second bonded zone 540 to being active in the first bonded zone 538, examples disclosed herein adjust a first audio playback configuration (e.g., an equalization setting and/or a volume setting) of the playback device labeled with reference numeral 504, a second audio playback configuration of the playback device labeled with reference numeral 506, a third audio playback configuration of the playback device labeled with reference numeral 508, and a fourth audio playback configuration of the shared playback device 510. That is, the playback devices 504-508 of the first bonded zone 538 and the shared playback device 510 are adjusted in accordance with the shared playback device 510 being active in the first bonded zone 538. For example, when the shared playback device 510 is a subwoofer, the first, second, third and fourth audio playback configurations of the respective playback devices 504-508 are adjusted such that the shared playback device 510 presents low frequency components of the audio spectrum and the other playback devices 505, 506, 508 present the remaining frequency components without having to produce the low frequency components handled by the shared playback device 510.

To continue the above example, when the shared playback device 510 changes from being active in the second bonded zone 540 to being active in the first bonded zone 538, examples disclosed herein adjust audio playback configurations of the second bonded zone 540 in accordance with the shared playback device 510 being inactive in the second bonded zone 540. For example, when the shared playback device 510 becomes inactive in the second bonded zone 540, examples disclosed herein adjust a fifth audio playback configuration of the playback device labeled with reference numeral 512 and a sixth audio playback configuration of the playback device labeled with reference numeral 513. For example, when the shared playback device 510 is a subwoofer that handles the low frequency components of the audio spectrum when active in the second bonded zone 540, the fifth and sixth audio configurations are adjusted when the shared playback device 510 unjoins the second bonded zone 540 such that the corresponding playback devices 512, 513 produce the low frequency components of the audio spectrum that were previously handled by the shared playback device 510.

Figure 6:
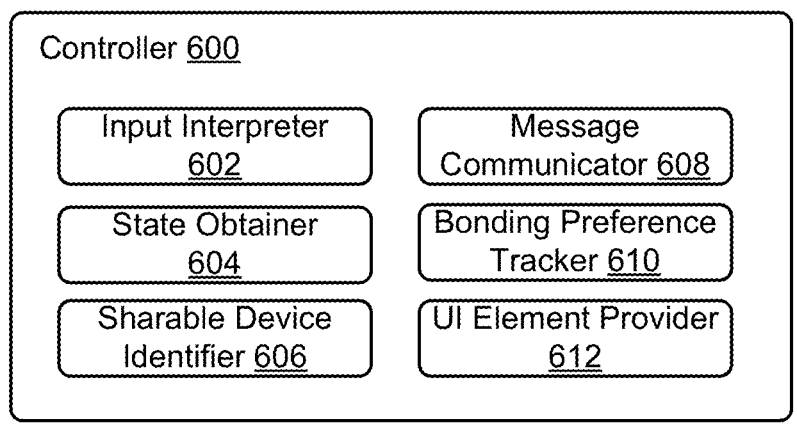
FIG. 6 shows an example functional block diagram of an example controller.

FIG. 6 is a block diagram of an example controller 600 constructed in accordance with examples disclosed herein that can be used for dynamic bonding disclosed herein. The example controller 600 of FIG. 6 may be implemented in, for example, the first controller 526 of FIG. 5, the second controller 528 of FIG. 5, and/or the control device 300 of FIG. 3. In some examples, the controller 600 cooperates with and/or is integrated into the example control interface 400 of FIG. 4. While the example controller 600 of FIG. 6 is described below in connection with the example media playback system of FIG. 5, the example controller 600 of FIG. 6 can be used in connection with any suitable media playback system and in any suitable environment.

The example controller 600 of FIG. 6 facilitates dynamic sharing of the example shared playback device 510 of FIG. 5 between, for example, the first bonded zone 538 and the second bonded zone 540. For example, the controller 600 enables a selection indicating which of the first and second bonded zones 538, 540 that the shared playback device 510 is to join at a given time. Additionally, the example controller 600 defines one or more rules (e.g., via default settings, updatable settings, and/or according to user input) that control how the media playback system 500 responds, with respective to the dynamic sharing of the shared playback device 510, to different scenarios and/or inputs. As such, the example controller 600 may provide an instruction to the playback devices 502-524 to implement a change in bonded zone membership in response to an input. Additionally or alternatively, the example playback devices 502-524 may implement a change in bonded zone membership according to one or more rules (e.g., without receiving an input from the controller 600). In some examples, the controller 600 prompts a user to confirm that a change in bonded zone membership is acceptable. For example, when the playback devices 502-524 automatically (e.g., according to a rule) determine that a switch to a different bonded zone is desirable, the example controller 600 may display a prompt requesting authorization for the dynamic change before implementing the change.

In some examples, the controller 600 receives input from a user. The example controller 600 of FIG. 6 includes an input interpreter 602 to identify an instruction associated with the received input. For example, the input interpreter 602 may determine that the received input is a request for the shared playback device 510 to unjoin the second bonded zone 540 and to join the first bonded zone 538. To implement the requested operations, the example controller 600 of FIG. 6 includes a state obtainer 604, a sharable device identifier 606 and a message communicator 608. In the illustrated example of FIG. 6, the state obtainer 604 determines a state of the media playback system 500. In the illustrated example, the state of the media playback system 500 is maintained in one or more data structures (e.g., tables and/or state variable(s)) indicative of, for example, which of the playback devices 502-524 are bonded together, which of the playback devices 502-524 are presenting media, and other information representative of the media playback system 500. To obtain the state information, the example state obtainer 604 of FIG. 6 sends a request message to, for example, one of the playback devices 502-524, a server, such as a cloud-based server or a server on a local network associated with the media playback system 500, and/or another local network device.

The example sharable device identifier 606 of FIG. 6 uses the obtained state information to determine which of the playback devices 502-524 are dynamically sharable. Additionally or alternatively, the example sharable device identifier 606 queries a lookup table (e.g., a table stored locally on a device on which the controller 600 is implemented and/or table stored in a server, such as a cloud-based server or a server local to the network associated with the media playback system 500). In the illustrated example, the sharable device identifier 606 determines that the shared playback device 510 of FIG. 5 is dynamically sharable between the first and second bonded zones 538, 540. That is, the example sharable device identifier 606 determines which of the playback devices 502-524 is available to be shared between bonded zones. Thus, if the example input interpreter 602 receives a request to have the shared playback device 510 become inactive in the second bonded zone 540 and active in the first bonded zone 538, the example state obtainer 604 obtains the state information and the example sharable device identifier 606 determines whether the corresponding playback device is dynamically sharable. For example, if the request received by the input interpreter 602 involves the shared playback device 510 of FIG. 5, the sharable device identifier 606 determines that the request is addressed to a playback device current designated as a dynamically sharable device.

When the sharable device identifier 606 indicates that the received request is associated with a sharable playback device, the example message communicator 608 of FIG. 6 sends a message to one or more of the playback devices 502-524 to implement the requested change in bonded zone membership of the shared playback device 510. In the illustrated example, the message communicator 608 sends the message to a master device of the bonded zone which the shared playback device 510 is to join. Alternatively, the example message communicator 608 may send the message to the shared playback device 510. As described in detail below in connection with FIG. 7, the playback device that receives the message from the message communicator 608 implements the requested change in bonded zone membership of the shared playback device 510 if current conditions correspond to such a change being permissible and/or preferred. As described in detail below, implementing the change involves, for example, adding an identifier corresponding to the shared playback device 510 to a data structure tracking members of the first bonded zone 538 and removing the identifier corresponding to the shared playback device 510 from a data structure tracking members of the second boned zone 540.

Accordingly, the example controller 600, via the input interpreter 602, the state obtainer 604, the sharable device identifier 606 and the message communicator 608, enables a receipt of a request to dynamically change which bonded zone to which the shared playback device 510 belongs and provides a corresponding instruction to the components of the media playback system 500 to implement the requested change, if appropriate. As described below in connection with FIG. 7, in some examples, one or more of the playback devices 502-524 may facilitate a change in bonded zone membership without involvement of the controller 600. That is, the example playback devices 502-524 can exchange messages between themselves to implement a change and then may inform the controller 600 of the change.

The example controller 600 of FIG. 6 includes a bonding preference tracker 610 to establish and/or maintain a preference indication for the shared playback device 510 and/or any other shared playback devices of the media playback system 500. While the first and second bonded zones 538, 540 are unlikely to be simultaneously presenting different audio, the example bonding preference tracker 610 identifies one of the bonded zones as a preferred bonded zone such that when such simultaneous playback occurs, the example bonding preference tracker 610 provides instructions (e.g., to one or more of the playback devices 502-524) to make the shared playback device 510 active in the preferred bonded zone (e.g., the first bonded zone 538). Alternatively, the example bonding preference tracker 610 may indicate that the shared playback device 510 is to remain active in the bonded zone to which the shared playback device 510 belonged when the simultaneous playback of different audio commenced.

The example controller 600 of FIG. 6 includes a user interface (UI) element provider 612 to provide one or more UI elements associated with the dynamic sharing of playback devices. The UI elements implemented by the example UI element provider 612 are displayed on, for example, the control device 300 of FIG. 3 (e.g., via the to communicate, for example status information associated with the dynamic sharing disclosed herein and/or availability information associated with the dynamic sharing disclosed herein. As described above, the example control device 300 implements a user interface. The example displays associated with the example UI element provider 612 may be integrated into the user interface of the control device 300, which includes display elements associated with the playback devices 502-524.

In some examples, the UI element provider 612 implements an indication on the display that a particular playback device, such as the shared playback device 510 of FIG. 5, is shared between two or more bonded zones. In some examples, the UI element provider 612 implements indications of which bonded zone currently includes the shared playback device 510. For example, the UI element provider 612 provides a first indication the display when the shared playback device 510 is active in the first bonded zone 538, and a second indication different than the first indication on the display when the shared playback device 510 is inactive in the first bonded zone. In some examples, the indication that the shared playback device 510 is inactive in a particular bonded zone is a greyed-out identifier of the shared playback device 510 displayed in association with that particular bonded zone. In some examples, the UI element provider 612 implements an indication on the display that a particular bonded zone is not using all playback devices available to that bonded zone (e.g., because the shared playback device 538 is currently joined to a different bonded zone or because a playback device of that zone is failed or powered off). In some examples, the UI element provider 612 implements an authorization request on the display that asks for confirmation that a change (e.g., an automatic change implemented by the playback device 502-524 according to a rule) in bonded zone membership is acceptable. In such instances, the change in bonded zone membership is dependent on an answer received via the prompt.

Figure 7:
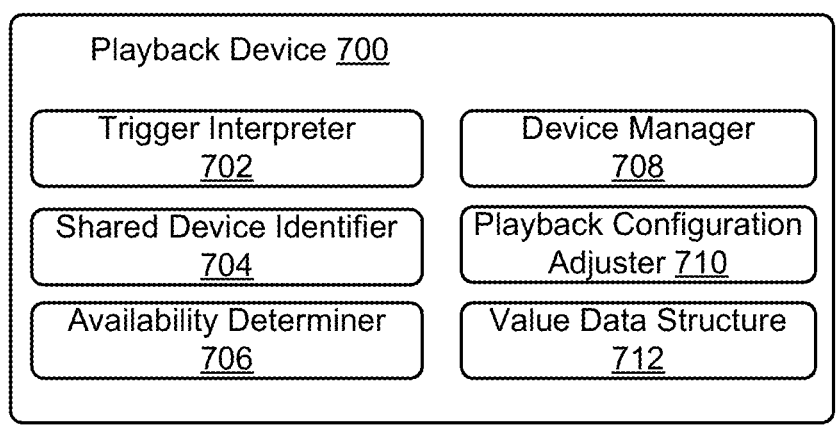
FIG. 7 shows an example functional block diagram of an example playback device.

FIG. 7 is a block diagram of an example playback device 700 constructed in accordance with examples disclosed herein. The example playback device 700 of FIG. 7 may be implemented via, for example, any of the playback device 502-524 of FIG. 5 and/or the example playback device 200 of FIG. 2. The following example describes the playback device 700 of FIG. 7 as corresponding to a master device of the first bonded zone 538. In particular, for purposes of illustration, the playback device labeled with reference numeral 504 of FIG. 5 is the master device for the first bonded zone 538. However, the example playback device 700 may correspond to any of the playback devices 502-524 of the media playback system 500 of FIG. 5, such as the playback device 512 of the second bonded zone 540 or the shared playback device 510. This flexibility of any one of the playback devices 502-524 being able to implement the example playback device 700 of FIG. 7 is enabled by each of the playback devices 502-524 storing and/or having read/write access to state tables and/or state variables that manage the state of the media playback system 500. Alternatively, if particular one(s) of the playback devices 502-524 have such capabilities, the example playback device 700 of FIG. 7 may be implemented by such playback devices.

As discussed above, the example playback device 700 of FIG. 7 implements the dynamic sharing of one or more playback devices between bonded zones such as, for example, the dynamic membership of the shared playback device 510 in the first and second bonded zones 538, 540 of FIG. 5. The example playback device 700 of FIG. 7 facilitate the sharing of the shared playback device 510 in response to, for example, a play command being received at one of the playback devices 502-524, an audio input detection (e.g., from a television with which a corresponding one of the playback devices 502-524 is in communication) at one of the playback devices 502-524, and/or a request received from, for example, the controller 600. In the illustrated example, when only one of the first and second bonded zones 538, 540 is presenting media, the shared playback device 510 is configured to be active in that bonded zone. In some instances, the shared playback device 510 is already part of the bonded zone that in which a play command is received. As such, the playback device 700 may not need to perform any update or change in some instances. Alternatively, when the shared playback device 510 is to become active in one bonded zone and/or inactive in another bonded zone, the example playback device 700 facilitates the addition and/or removal of the shared playback device 510.

The example playback device 700 includes a trigger interpreter 702 to determine whether a received input, such as a play command from a television or a request from the controller 600 to alter a bonded zone in which the shared playback device 510 is active, associated with the dynamic bonding disclosed herein is received. For example, the trigger interpreter 702 may determine that a play command was received from the first controller 526 to initiate audio playback in the first bonded zone 538. Alternatively, the example trigger interpreter 702 may determine that audio playback has ended in the first bonded zone 538 and begun in the second bonded zone 540, in which case the shared playback device 510 needs to be switched (e.g., automatically and without input from the controller 600) from active to inactive in the first bonded zone 538 and switch from inactive to active in the second bonded zone 540. In some examples, the example playback device 700 informs the example controller 600 that the switch has occurred and/or is going to occur.

The example shared device identifier 704 of FIG. 7 verifies and/or identifies the shared playback device 510 as a dynamically sharable device. For example, the shared device identifier 704 determines a type of the shared playback device and/or determines a designation of the shared playback device 510 in the media playback system 500 as a dynamically sharable device.

The example playback device 700 of FIG. 7 includes an availability determiner 706 to determine whether the shared playback device 510 can unjoin a currently joined bonded zone when, for example, a request is received for the shared playback device 510 to switch bonded zones. The example availability determiner 706 maintains and checks one or more rules or restrictions that prevent the shared playback device 510 from switching bonded zones in particular circumstances. For example, in response to receiving a shared player request at the playback device 700 indicating that the shared playback device 510 is requested to join the second bonded zone 540 and unjoin the first bonded zone 538, the availability determiner 706 determines whether the shared playback device 510 is currently presenting media. In some examples, the availability determiner 706 prevents or prohibits the requested switch when the shared playback device 510 is currently presenting media. Additionally or alternatively, the example availability determiner 706 prevents or prohibits the requested switch when the shared playback device 510 has presented media within a threshold amount of time. Further, in response to receiving a shared player request at the playback device 700 when the first and second bonded zones are presenting different media, the example availability determiner 706 identifies a preferred bonded zone (e.g., via the bonding preference tracker 610 of FIG. 6) and causes the shared playback device 510 to be active in the preferred bonded zone.

The example playback device 700 of FIG. 7 includes a device manager 708 to facilitate the dynamic membership of, for example, the shared playback device 510 between the first and second bonded zones 538, 540. In the illustrated example, the device manager 708 has access to network state information and updates one or more corresponding data structures (e.g., state tables and/or state variables) that control, for example, which of the playback devices 502-524 belong to which bonded zones. When the shared playback device 510 is joining one bonded zone and unjoining another bonded zone, the example device manager 708 updates the data structures to reflect the addition and the removal. In the illustrated example, the data structures are stored at each of the playback devices 502-524, and the device manager 708 facilitates the propagation of the changes to each of the playback devices 502-524. In some examples, the device manager 708 provides audio identifying information (e.g., a uniform resource locator indicative of which audio content is being played) to the shared playback device 510 when the shared playback device 510 is transitioning between bonded zones.

The example playback device 700 of FIG. 7 includes a playback configuration adjuster 710 to adjust the playback configurations of the playback devices in accordance with the current status of, for example, the shared playback device 510. The example playback configuration adjuster 710 maintains a value data structure 712 that includes different values for one or more audio playback parameters for the respective playback devices. For example, for each one of the playback devices 504-508 of the first bonded zone 538, the example playback configuration adjuster 710 maintains first values for the one or more audio playback parameters for use when the shared playback device 510 is active in the first bonded zone 538 and second, different values for the one or more audio playback parameters for use when the shared playback device 510 is inactive in the first bonded zone 538. Additionally, for each one of the playback devices 512, 513 of the second bonded zone 540, the example playback configuration adjuster 710 maintains third values for the one or more audio playback parameters for use when the shared playback device 510 is active in the second bonded zone 540 and fourth, different values for use when the shared playback device 510 is inactive in the second bonded zone 540. In some examples, the playback configuration adjuster 710 maintains particular values for the playback devices when the shared playback device 510 is active in both the first and second bonded zones 538, 540. In some examples, the values maintained for the shared playback device 510 differ depending on which bonded zone includes the shared playback device 510. In some examples, the values maintained for the shared playback device 510 are the same regardless of which bonded zone includes the shared playback device 510.

The example playback configuration adjuster 710 of FIG. 7 references the value data structure 712 with scenario indicative information (e.g., state information indicative of a current scenario of the media playback system 500) and implements the appropriate values for the one or more audio playback parameters in accordance with which of the bonded zones 538, 540 currently includes the shared playback device 510. For example, when the shared playback device 510 is active in the first bonded zone 538, the playback configuration adjuster 710 facilitates values for the playback devices 504-508 in which those devices do not present low frequency components of the audio content because the shared playback device 510 is a subwoofer that is customized for outputting those components of the audio spectrum. Conversely, when the shared playback device 510 is inactive in the first bonded zone 538, the playback configuration adjuster 710 facilitates value for one or more of the playback devices 504-508 in which one or more of those devices present the low frequency components of the audio content.

Figure 8:
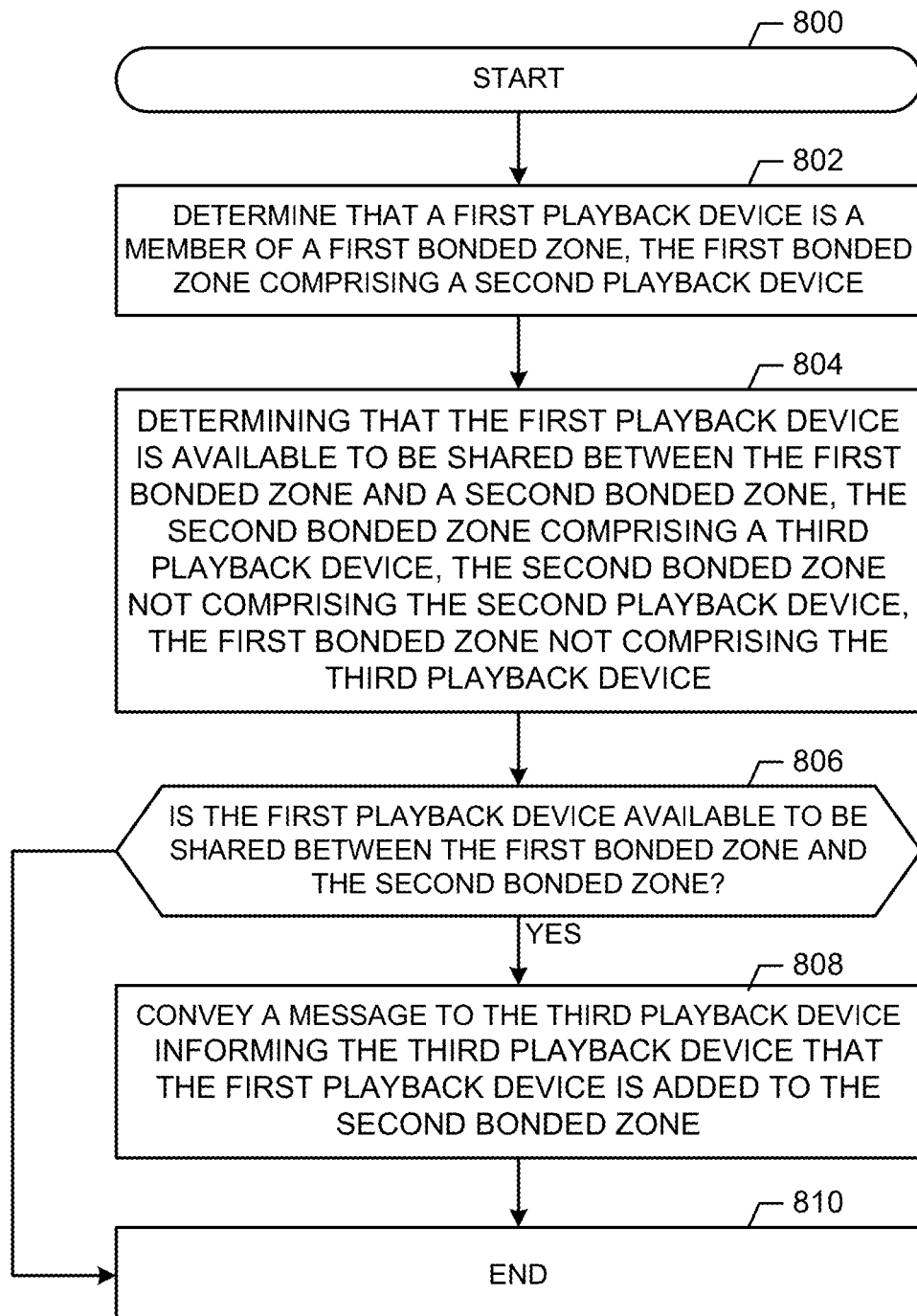
FIG. 8 shows an example flow diagram that illustrates a first example method implemented by a controller to facilitate example dynamic bonding of playback devices.
Figure 9:
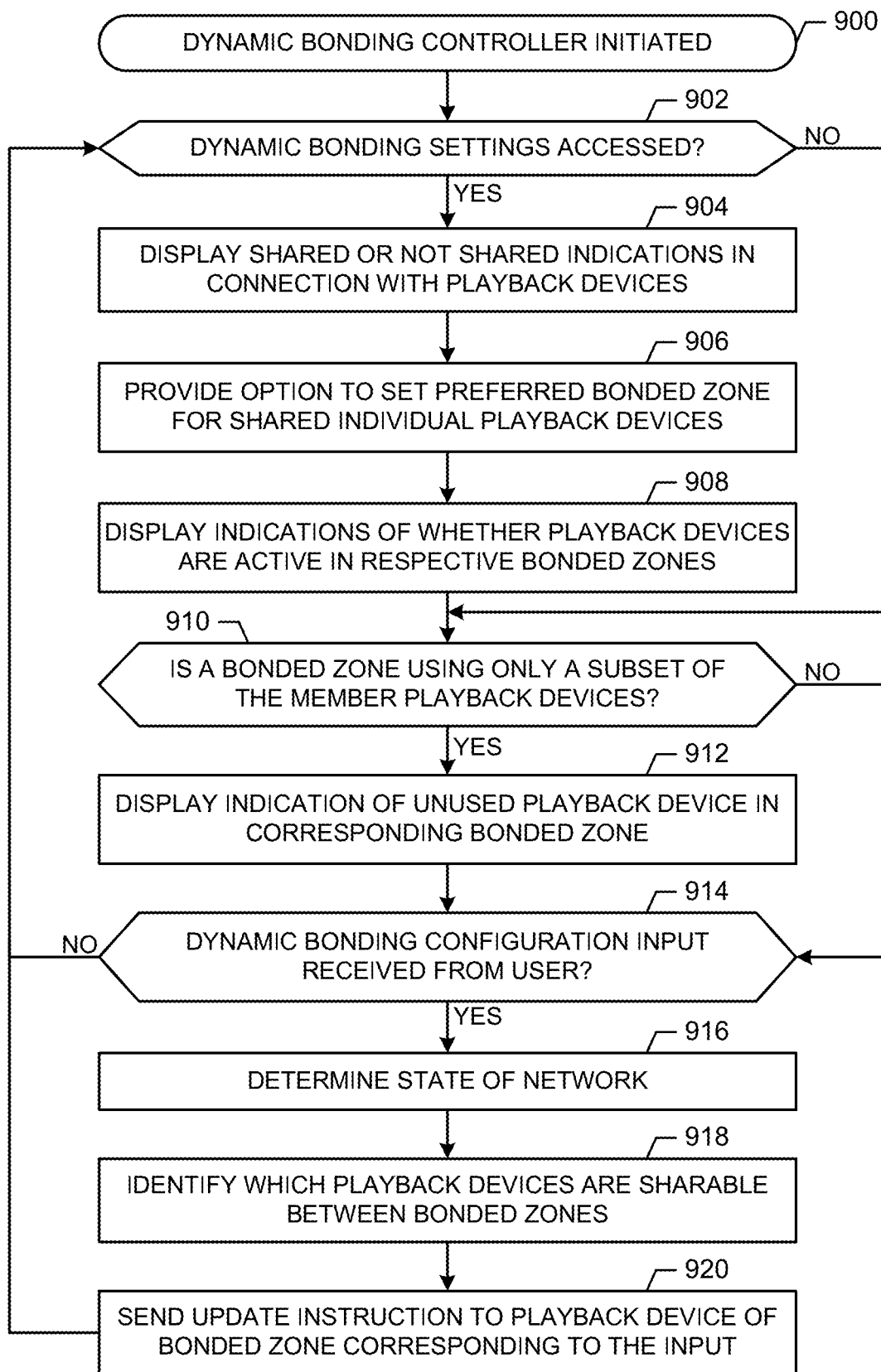
FIG. 9 shows an example flow diagram that illustrates a second example method implemented by a controller to facilitate example dynamic bonding of playback devices.
Figure 10:
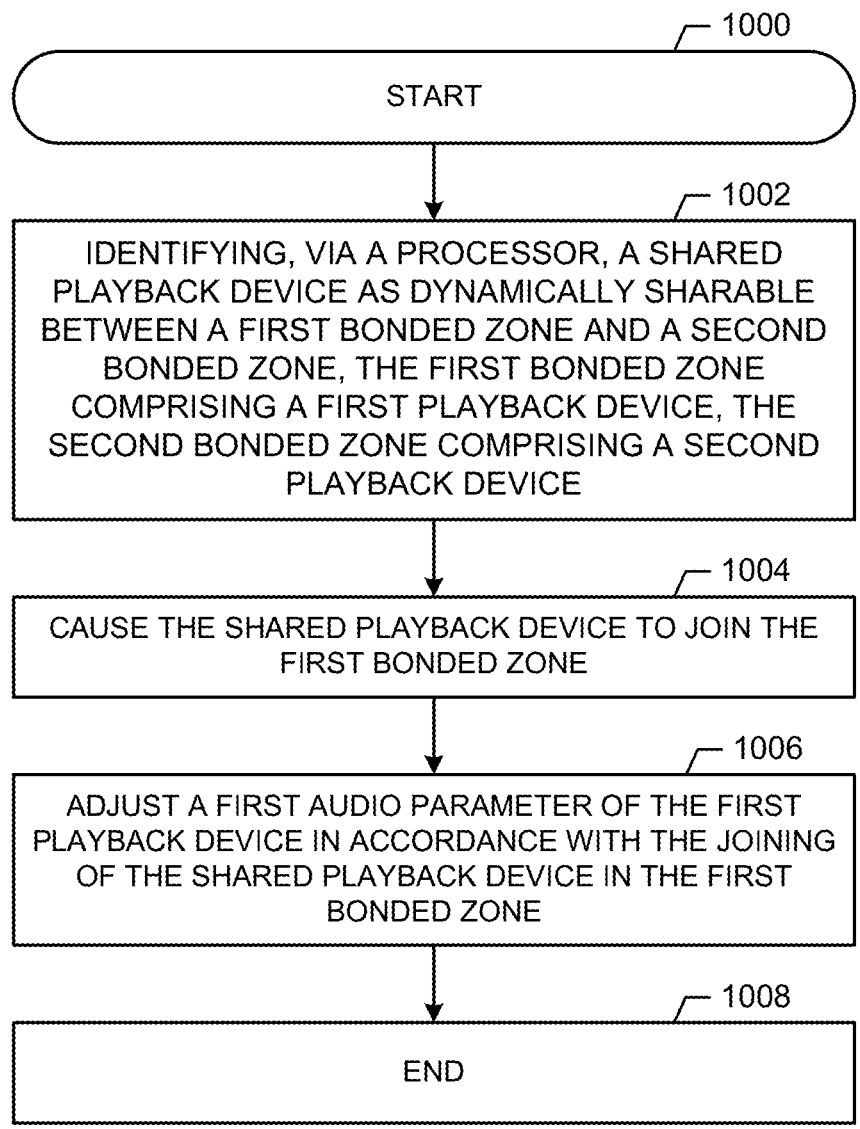
FIG. 10 shows an example flow diagram that illustrates a first example method implemented by a playback device to facilitate example dynamic bonding of playback devices.
Figure 11:
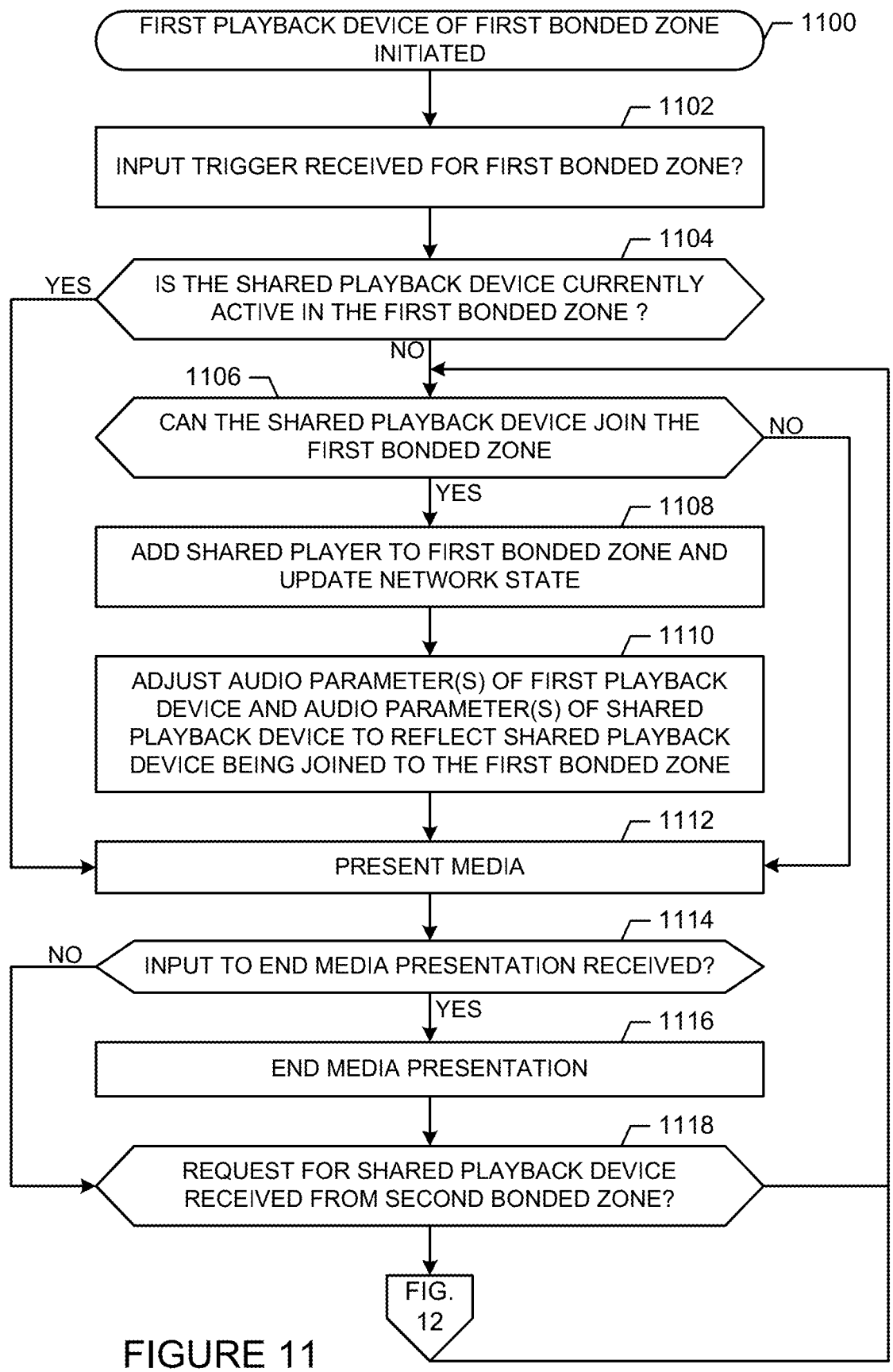
FIGS. 11 and 12 show an example flow diagram that illustrates a second example method implemented by a playback device to facilitate example dynamic bonding of playback devices.
Figure 12:
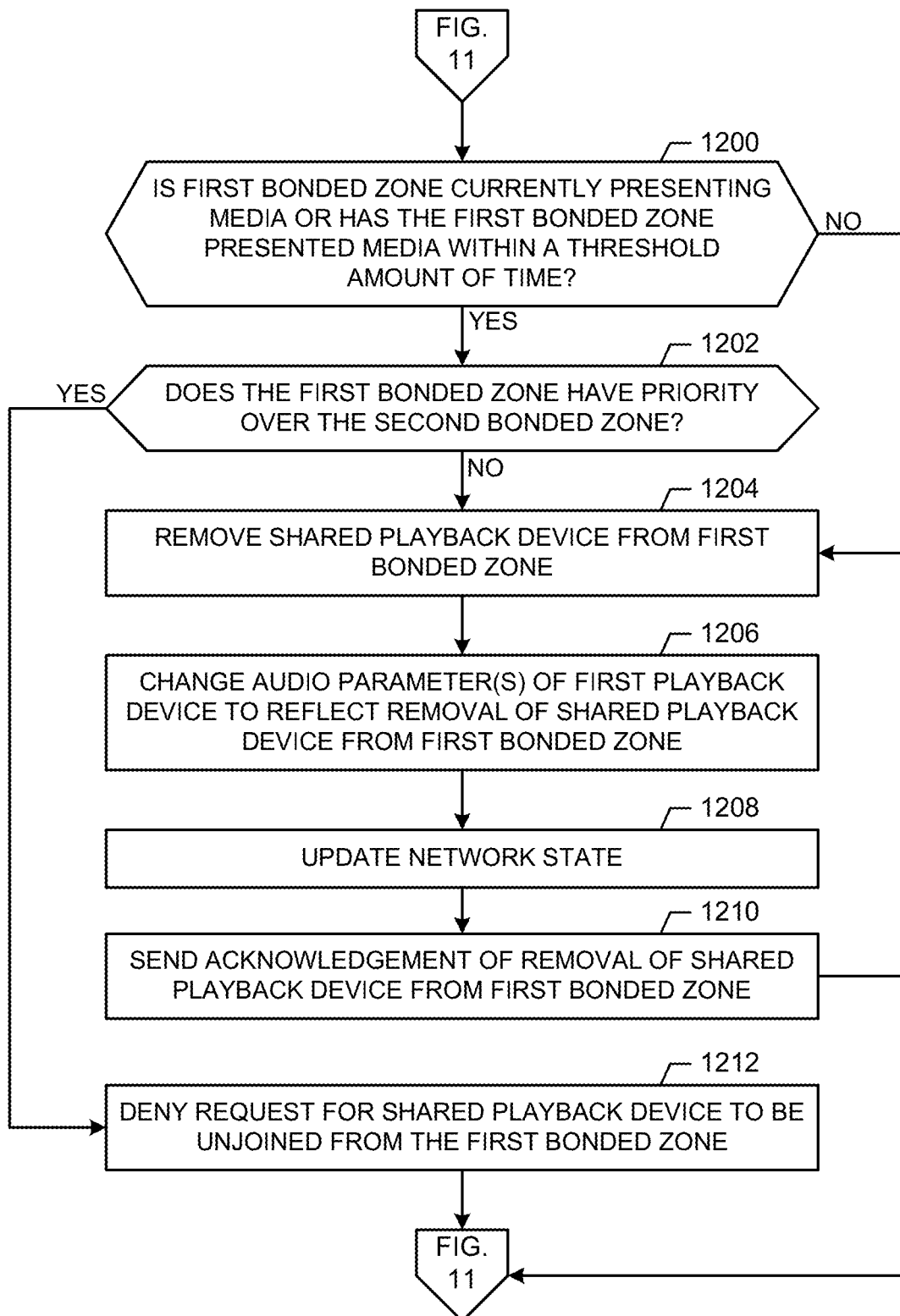

FIGS. 8 and 9 present example methods that can be implemented by the example controller 600 of FIG. 6. FIGS. 10-12 present example methods that can be implemented by the example playback device 700 of FIG. 7. The example methods of FIGS. 8-12 may include one or more operations, functions, or actions as illustrated by one or more of blocks. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the example methods of FIGS. 8-12 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the example methods of FIGS. 8-12 and other processes and methods disclosed herein, each block in FIGS. 8-12 may represent circuitry that is wired to perform the specific logical functions in the process.

The example method of FIG. 8 begins with an initiation of the controller 600 (block 800). In the illustrated example of FIG. 8, the controller 600 determines (e.g., via the state obtainer 604) that a first playback device (e.g., the shared playback device 510 of FIG. 5) is a member of a first bonded zone (e.g., the first bonded zone 538 associated with the living room 532 of FIG. 5), the first zone including a second playback device (e.g., the playback device labeled with reference numeral 504 in FIG. 5) (block 802). In the illustrated example of FIG. 8, the controller 600 determines (e.g., via the sharable device identifier 606) that the first playback device is available to be shared between the first bonded zone and a second bonded zone (e.g., the second bonded zone 540 associated with the dining room 534 of FIG. 5), the second bonded zone comprising a third playback device (e.g., the playback device labeled with reference numeral 512 in FIG. 5), the second bonded zone not comprising the second playback device, the first bonded zone not comprising the third playback device (block 804. In the illustrated example of FIG. 8, if the first playback device is available to be shared between the first bonded zone and the second bonded zone (e.g., the first playback device is the shared playback device 510 of FIG. 5) (block 806), the controller 600 sends (e.g., via the message communicator 608) a message to the third playback device informing the third playback device that the first playback device is added to the second bonded zone (block 808). The example of FIG. 8 then ends (block 810). In the illustrated example of FIG. 8, if the first playback device is not available to be shared between the first bonded zone and the second bonded zone (block 806), the example of FIG. 8 ends (block 810).

The example method of FIG. 9 begins with an initiation of the controller 600 (block 900). In the example of FIG. 9, the input interpreter 600 of the controller 600 determines whether settings and/or an interface associated with the dynamic bonding functionality disclosed herein is accessed (block 902). For example, a screen and/or portion of the example control interface 400 of FIG. 4 may correspond to the dynamic bonding functionality. In the example of FIG. 9, the UI element provider 612 of the controller 600 facilitates display appropriate display elements. In the example of FIG. 9, the UI element provider 612 displays a shared indication or an unshared indication in connection with individual ones of the playback devices 502-524 (block 904). For example, an identifier associated with the respective playback devices 502-524 may have a characteristic (e.g., color, font, size, and/or shape) that is altered when the corresponding one of the playback devices 502-524 is shared.

In the example of FIG. 9, the UI element provider 612 provides an option to set a preferred bonded zone for shared ones of the playback devices 502-524 (block 906). For example, a toggle display element may be engaged to change whether the corresponding one of the playback devices 502-524 is shared between bonded zones.

In the example of FIG. 9, the UI element provider 612 provides display indications of whether playback devices are active in respective bonded zones (block 908). For example, in a settings view associated with a particular bonded zone, such as the first bonded zones 538 of FIG. 5, one or more identifiers associated with individual playback devices is greyed out to indicate that the corresponding playback device is not active in that bonded zone.

In the example of FIG. 9, if a particular bonded zone is not using all playback devices that are included in that bonded zone, the UI element provider 612 (block 910), the UI element provider 612 displays an indication of unused playback devices in the bonded zone (block 912). Such instances arise when, for example, a shared playback device is active in another bonded zone or if a playback device is in a failure state or powered off.

In some examples, the controller 600 receives a request from, for example, a user to change the bonded zone to which a shared playback device, such as the shared playback device 510 of FIG. 5, belongs. That is, the controller 600 may receive in input requesting a change in the dynamic bonding configuration of the media playback system 500 of FIG. 5. In the example of FIG. 9, if such a dynamic bonding configuration input is received via the example input interpreter 602 (block 914), the example state obtainer 604 determines a state of the network (block 916). Further, the example sharable device identifier 606 identifies which playback devices are sharable between the bonded zones (block 918). For example, the state obtainer 604 may determine that the shared playback 510 of FIG. 5 is currently active in the second bonded zone 540 and the sharable device identifier 60 may identify the shared playback device 510 as dynamically sharable between the first and second bonded zones 538, 540. In the example of FIG. 9, the message communicator 608 sends an update instruction to, for example, one of the playback devices 502-524 corresponding to the received configuration change input (block 920). For example, the message communicator 608 sends a message to a master one of the playback devices 504-508 instructing that playback device to add the shared playback device 510 to the first bonded zone 538 and to remove the shared playback device 510 from the second bonded zone 540. In the example of FIG. 9, control returns to block 902.

The example of FIG. 10 begins with an initiation of the example playback device 700 of FIG. 7 (block 1000). In the illustrated example of FIG. 10, the playback device identifies (e.g., via the shared device identifier 704) a shared playback device as dynamically sharable between a first bonded zone and a second bonded zone, the first bonded zone comprising a first playback device, the second bonded zone comprising a second playback device (block 1002). In the illustrated example of FIG. 10, the playback device 700 causes (e.g., via the device manager 708) the shared playback device to join the first bonded zone (block 1004). In the illustrated example of FIG. 10, the playback device 700 adjusts (e.g., via the playback configuration adjuster 710) a first audio parameter of the first playback device in accordance with the joining of the shared playback device in the first bonded zone (block 1006). The example of FIG. 10 then ends (block 1008).

FIGS. 11 and 12 begin with an initiation of the example playback device 700 of FIG. 7 (block 1100). In the example of FIGS. 11 and 12, the playback device 700 is one of the playback devices 504-508 of the first bonded zone 538 designated as a master device for the first bonded zone 538. However, the example of FIGS. 11 and 12 may be implemented by, for example, any of the playback devices 502-524 of FIG. 5.

In the illustrated example, the trigger interpreter 702 of the playback device 700 determines that an input, such as a play command or an audio input detection from another media presentation device, is received for playback in the first bonded zone 538 (block 1102). In response, the example device manager 708 determines whether the shared playback device 510, which may be verified as sharable by the example shared device identifier 704, is currently active in the first bonded zone 538 (block 1104). For example, the device manager 708 references a data structure indicative of a state of the network to determine whether the shared playback device 510 of FIG. 5 is currently joined to the first bonded zone 538. If the shared playback device 510 is inactive in the first bonded zone 538, the example availability determiner 706 determines whether the shared playback device 510 is available to join or become active in the first bonded zone 538 (block 1106). For example, the availability determiner 706 references state information that includes an indication as to whether the shared playback device 510 is currently presenting media and/or is active in a bonded zone (e.g., the second bonded zone 540) that is presenting media. If the shared playback device 510 is available to join the first boned zone 538, the example device manager 708 adds the shared playback device 510 to the first bonded zone 538 by, for example, updating one or more state variables in a state information data structure (block 1108). In the illustrated example, any suitable one of the playback devices 502-524 may update the state variables in the state information data structure. For example, the shared playback device 510 may add itself to the first bonded zone 538. Alternatively, the shared playback device 510 may instruct another one of the playback devices 502-524 to add the shared playback device 510 to the first bonded zone 538. Accordingly, any of the playback devices 502-524 may perform one or more changes to the bonded zone membership information and/or instruct any of the playback devices 502-524 to perform the one or more changes to the bonded zone membership information.

In response to the addition of the shared playback device 510 to the first bonded zone 538, the example playback configuration adjuster 710 adjust one or more audio parameters of the playback devices 504-508 of the first bonded zone 538 and/or one or more audio parameters of the shared playback device 510 (block 1110). In the illustrated example, the playback configuration adjuster 710 references the value data structure 712 to obtain the appropriate values for the audio parameters given the current configuration of the media playback system 500.

In the example of FIG. 11, the first bonded zone 530 presents the media in response to the shared playback device already being active in the first bonded zone 538 at block 1104 (block 1112). Additionally, the first bonded zone 530 presents the media in response to determining that the shared playback device is unable to join the first bonded zone at block 1106 (block 1112). In such instances, the playback configuration adjuster 710 sets the audio parameters of the playback devices 504-508 of the first bonded zone 538 in accordance with the shared playback device 510 being inactive in the first bonded zone 538, which may differ from the audio parameters when the shared playback device 510 is active in the first bonded zone 538. Additionally, the first bonded zone 530 presents the media in response to the adjustment of the audio parameters at block 1110 (block 1112).

In the example of FIG. 11, while the media is being presented in the first bonded zone 538, an input may be received to end the media presentation (block 1114). If such an input is received, the media presentation is ended in the first bonded zone 538 (block 1116).

In the example of FIG. 11, the trigger interpreter 702 determines whether a request for the shared playback device 510 to join the second bonded zone 540 is received (block 1118). If no such request has been received, control returns to block 1106. If such request has been received, control passes to block 1200 of FIG. 12.

In the example of FIG. 12, the availability determiner 706 determines whether the first bonded zone 538 is currently presenting media or has presented media within a threshold amount of time (e.g., five seconds) (block 1200). If so, the example availability determiner 706 determines whether the first bonded zone 538 has priority over the second bonded zone 540 for the shared playback device (block 1202). For example, the availability determiner 706 communicates with the example bonding preference tracker 610 of FIG. 6 to determine which of the first and second bonded zones 538, 540 is the preferred bonded zone for the shared playback device 510.

If the first bonded zone 538 does not have priority over the second bonded zone 540 at block 1202, or if the first bonded zone is not presenting media and has not presented media within the threshold amount of time at block 1200, the example device manager 708 removes the shared playback device 510 from the first bonded zone 538 (block 1204). Additionally, the example playback configuration adjuster 710 change the audio parameter(s) of the playback devices 504-508 of the first bonded zone 538 according to data stored in the value data structure 712 in connection with the shared playback device 510 being inactive in the first bonded zone 538 (block 1206). In the example of FIG. 12, the device manager 708 updates the state information associated with the media playback system 500 to reflect the change of the shared playback device 510 from being active in the first bonded zone 538 to being inactive in the first bonded zone 538 (block 1208). In some examples, the device manager 708 propagates the update to the state information to all of the playback devices 502-524, all of which may store the state information.

In the example of FIG. 12, the device manager 708 sends an acknowledgement indicating the removal of the shared playback device 510 from the first bonded zone 538 to, for example, one of the playback devices 502-524 that requested the shared playback device 510 (block 1210). For example, a master one of the playback devices 512, 513 of the second playback zone 540 may have requested the shared playback device 510 and, if so, the acknowledgement is sent to that master device. Control then returns to FIG. 11.

Referring to block 1202, if the first bonded zone is currently presented media or has presented media within the threshold amount of time, and if the first bonded zone 538 has priority over the second bonded zone 540, the availability determiner 706 denies the request to remove the shared playback device 510 from the first bonded zone 538 (block 1212). Control then returns to FIG. 11.

Figure 13:
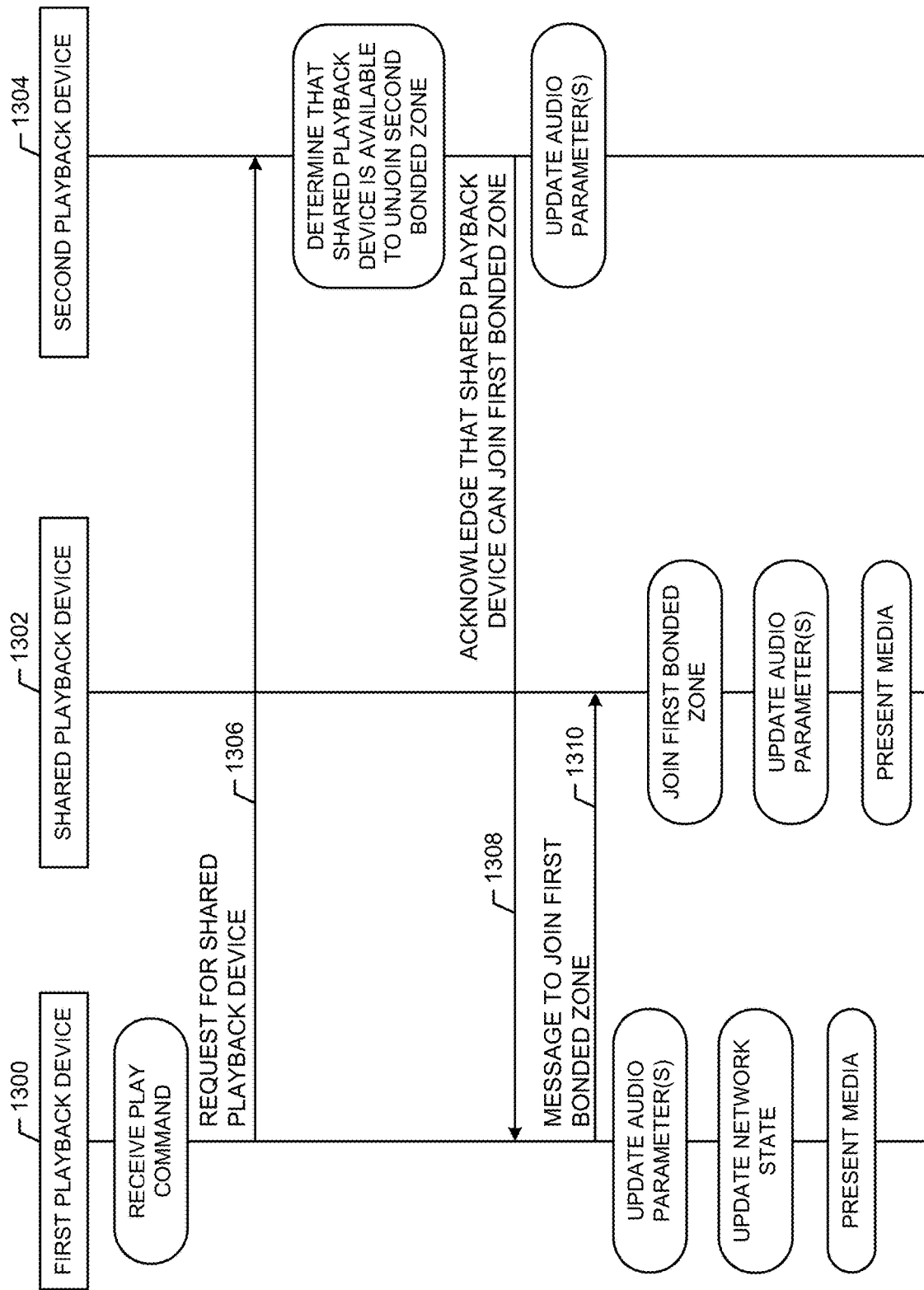
FIG. 13 shows an example diagram depicting a flow of data to facilitate example dynamic bonding of playback devices.

FIG. 13 is a data flow diagram illustrated example communications between a first playback device 1300 (e.g., the playback device labeled with reference numeral 504 in FIG. 5) of a first bonded zone (e.g., the first bonded zone 538 of FIG. 5), a shared playback device 1302 (e.g., the shared playback device 510 of FIG. 5), and a second playback device (e.g., the playback device labeled with reference numeral 512 in FIG. 5) of a second bonded zone (e.g., the second bonded zone 540 of FIG. 5).

In the example of FIG. 13, the first playback device 1300 receives a play command from, for example, the controller 600 of FIG. 6 or via an audio input detection from a media presentation device such as a television or computing device. In the illustrated example, the shared playback device 1302 is active in the second bonded zone at time of the received play command. In response, the example first playback device 1300 of FIG. 13 sends a request 1306 for the shared playback device 1302 to the second playback device 1304. Alternatively, the first playback device 1300 may reference a state information data structure that indicates that the shared playback device 1302 is available and may communicate with the shared playback device 1302 to join the first bonded zone.

In the illustrated example, in which the first playback device 1300 sends the request 1306, the second playback device 1304 determines whether the shared playback device 1302 is available to unjoin the second bonded zone. For example, if the second playback device 1304 is currently presenting media, the shared playback device 1302 is determined to be unavailable to unjoin the second bonded zone. In the illustrated example, the shared playback device 1302 is available to unjoin the second bonded zone and, thus, the second playback device sends an acknowledgement 1308 to the first playback device 1300 indicating the availability of the shared playback device 1302 to unjoin the second bonded zone. The second playback device 1304 removes the shared playback device 1302 from the second bonded zone and updates the audio playback configuration(s) of the playback devices of the second bonded zone according to the shared playback device 1302 being inactive in the second bonded zone. Additionally or alternatively, the shared playback device 1304 may remove itself from the association with the second playback device 1304 and update the state information data structure accordingly.

In the example of FIG. 13, the first playback device 1300 sends an instruction 1310 to the shared playback device 1302 to join the first bonded zone. Additionally, the first playback device 1300 of FIG. 13 updates the audio playback configuration(s) of the playback devices of the first bonded zone according the shared playback device 1302 being active in the first bonded zone. In the example of FIG. 1300, the shared playback device 1302 joins the first bonded zone and updates the audio playback configuration of the shared playback device 1302 according to being active in the first bonded zone.

In the example of FIG. 13, the first playback device 1300 and the shared playback device 1302 present media with the audio playback configurations set in accordance with the shared playback device 1302 being active in the first bonded zone.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the examples provided herein involve dynamic bonding of playback devices. In one aspect, a method is provided. The method includes determining, via a processor, that a first playback device is a member of a first bonded zone, the first bonded zone comprising a second playback device; determining, via the processor, that the first playback device is available to be shared between the first bonded zone and a second bonded zone, the second bonded zone comprising a third playback device, the second bonded zone not comprising the second playback device, the first bonded zone not comprising the third playback device; and sending, via the processor, a message to the third playback device informing the third playback device that the first playback device is added to the second bonded zone.

In some examples, the method further includes providing an indication on a display that the first playback device is shared between the first bonded zone and the second bonded zone.

In some examples, the method further includes storing a preferred bonded zone in association with the first playback device, the preferred bonded zone indicating which of the first and second bonded zones the first playback device is to join when both the first and second bonded zones are presenting media.

In some examples, the method further includes causing at least one of the first, second, or third playback devices to store a preferred bonded zone in association with the first playback device, the preferred bonded zone indicating which of the first and second bonded zones the first playback device is to join when both the first and second bonded zones are presenting media.

In some examples, the method further includes providing a first indication on a display when the first playback device is active in the first bonded zone; and providing a second indication different than the first indication on the display when the first playback device is inactive in the first bonded zone.

In some examples, the method further includes providing an indication on a display that the first bonded zone is not using all playback devices of the first bonded zone.

In some examples, the determining that the first playback device is available to be shared between the first bonded zone and the second bonded zone includes querying a data structure with an identifier of the first playback device, the data structure comprising entries for different playback devices respectively indicating whether the corresponding one of the playback devices is available to be shared between bonded zones.

In some examples, the message causes the third playback device to add the first playback device to the second bonded zone by changing a data structure governing membership in the second bonded zone.

In some examples, the message causes a first change in a data structure governing membership in the second bonded zone, a second change in a first audio playback parameter of the first playback device, and a third change in a second audio playback parameter of the third playback device.

In some examples, the third playback device is a master device of the second bonded zone.

In some examples, the method further includes determining whether the first playback device is available to be shared between the first bonded zone and the second bonded zone, wherein the sending of the message to the third playback device is in response to the determining that the first playback device is available to be shared between the first bonded zone and the second bonded zone.

In another aspect, an apparatus is provided. The apparatus includes a state obtainer to determine that a first playback device is a member of a first bonded zone, the first bonded zone comprising a second playback device; a sharable device identifier to determine that the first playback device is available to be shared between the first bonded zone and a second bonded zone, the second bonded zone comprising a third playback device, the second bonded zone not comprising the second playback device, the first bonded zone not comprising the third playback device; and a message communicator to send a message to the third playback informing the third playback device that the first playback device is added to the second bonded zone, wherein at least one of the state obtainer, the sharable device identifier or the message communicator is implemented via a processor.

In some examples, the apparatus further includes a user interface element provider to present an indication on a display that the first playback device is shared between the first bonded zone and the second bonded zone.

In some examples, the apparatus further includes a bonding preference tracker to maintain a preferred bonded zone in association with the first playback device, the preferred bonded zone indicating which of the first and second bonded zones the first playback device is to join when both the first and second bonded zones are presenting media.

In some examples, the apparatus further includes a bonding preference tracker to cause at least one of the first, second, or third playback devices to store a preferred bonded zone in association with the first playback device, the preferred bonded zone indicating which of the first and second bonded zones the first playback device is to join when both the first and second bonded zones are presenting media.

In some examples, the apparatus further includes a user interface element provider to present a first indication on a display when the first playback device is active in the first bonded zone; and present a second indication different than the first indication on the display when the first playback device is inactive in the first bonded zone.

In some examples, the apparatus further includes a user interface element provider to present an indication on a display that the first bonded zone is not using all playback devices of the first bonded zone.

In some examples, the sharable device identifier is to determine that the first playback device is available to be shared between the first bonded zone and the second bonded zone by querying a data structure with an identifier of the first playback device, the data structure comprising entries for different playback devices respectively indicating whether the corresponding one of the playback devices is available to be shared between bonded zones.

In some examples, the message causes the third playback device to add the first playback device to the second bonded zone by changing a data structure governing membership in the second bonded zone.

In some examples, the message causes a first change in a data structure governing membership in the second bonded zone, a second change in a first audio playback parameter of the first playback device, and a third change in a second audio playback parameter of the third playback device.

In some examples, the apparatus further includes the third playback device is a master device of the second bonded zone.

In some examples, the apparatus further includes the sharable device identifier is to determine whether the first playback device is available to be shared between the first bonded zone and the second bonded zone, and the message communicator is to send the message to the third playback device in response to the sharable device identifier determining that the first playback device is available to be shared between the first bonded zone and the second bonded zone.

In another aspect, a non-transitory computer readable memory is provided. The non-transitory computer readable memory has stored thereon instructions executable by a computing device to cause the computing device to perform operations. The operations include determining that a first playback device is a member of a first bonded zone, the first bonded zone comprising a second playback device; determining that the first playback device is available to be shared between the first bonded zone and a second bonded zone, the second bonded zone comprising a third playback device, the second bonded zone not comprising the second playback device, the first bonded zone not comprising the third playback device; and sending a message to the third playback device informing the third playback device that the first playback device is added to the second bonded zone.

In some examples, the operations further include providing an indication on a display that the first playback device is shared between the first bonded zone and the second bonded zone.

In some examples, the operations further include storing a preferred bonded zone in association with the first playback device, the preferred bonded zone indicating which of the first and second bonded zones the first playback device is to join when both the first and second bonded zones are presenting media.

In some examples, the operations further include causing at least one of the first, second, or third playback devices to store a preferred bonded zone in association with the first playback device, the preferred bonded zone indicating which of the first and second bonded zones the first playback device is to join when both the first and second bonded zones are presenting media.

In some examples, the operations further include providing a first indication on a display when the first playback device is active in the first bonded zone; and providing a second indication different than the first indication on the display when the first playback device is inactive in the first bonded zone.

In some examples, the operations further include providing an indication on a display that the first bonded zone is not using all playback devices of the first bonded zone.

In some examples, the determining that the first playback device is available to be shared between the first bonded zone and the second bonded zone includes querying a data structure with an identifier of the first playback device, the data structure comprising entries for different playback devices respectively indicating whether the corresponding one of the playback devices is available to be shared between bonded zones.

In some examples, the message causes the third playback device to add the first playback device to the second bonded zone by changing a data structure governing membership in the second bonded zone.

In some examples, the message causes a first change in a data structure governing membership in the second bonded zone, a second change in a first audio playback parameter of the first playback device, and a third change in a second audio playback parameter of the third playback device.

In some examples, the third playback device is a master device of the second bonded zone.

In some examples, the operations further include determining whether the first playback device is available to be shared between the first bonded zone and the second bonded zone, and the sending of the message to the third playback device is in response to the determining that the first playback device is available to be shared between the first bonded zone and the second bonded zone.

In another aspect, a method is provided. The method includes identifying, via a processor, a shared playback device as sharable between a first bonded zone and a second bonded zone, the first bonded zone comprising a first playback device, the second bonded zone comprising a second playback device; causing, via the processor, the shared playback device to join the first bonded zone; and adjusting, via the processor, a first audio parameter of the first playback device in accordance with the joining of the shared playback device in the first bonded zone.

In some examples, the method further includes causing the shared playback device to unjoin the second bonded zone.

In some examples, the method further includes causing an adjustment to a second audio parameter of the second playback device in accordance with the unjoining of the shared playback device from the second bonded zone.

In some examples, the method further includes, in response to receiving a shared player request at the first playback device indicating that the shared playback device is requested to join the second bonded zone: determining that the shared playback device is available to unjoin the first bonded zone; removing the shared playback device from the first bonded zone; and adjusting the first audio parameter of the first playback device in accordance with the unjoining of the shared playback device from the first bonded zone.

In some examples, the method further includes determining whether the shared playback device is available to unjoin the first bonded zone by determining whether the first bonded zone is currently presenting media.

In some examples, the method further includes determining whether the shared playback device is available to unjoin the first bonded zone by determining whether the first bonded zone has presented media within a threshold amount of time.

In some examples, the method further includes determining whether the shared playback device is available to unjoin the first bonded zone by identifying a sharing priority of the shared playback device between the first and second bonded zones.

In some examples, the method further includes maintaining a first value for the first audio parameter for use when the shared playback device is joined to the first bonded zone, and maintaining a second value for the first audio parameter for use when the shared playback device is not joined to the first bonded zone.

In some examples, the shared playback device is a subwoofer.

In some examples, the causing of the shared playback device to join the first bonded zone is in response to identifying data received at the first playback device as a playback trigger.

In some examples, the playback trigger comprises a play command or an audio input detection.

In another aspect, a first playback device is provided. The first playback device includes a shared device identifier to determine that a second playback device is sharable between a first bonded zone and a second bonded zone, the first bonded zone comprising the first playback device, the second bonded zone comprising a second playback device; a device manager to cause the shared playback device to join the first bonded zone; and an adjuster to change a first audio parameter of the first playback device in accordance with the joining of the shared playback device in the first bonded zone, wherein at least one of the shared device identifier, the device manager, or the adjuster is implemented via a processor.

In some examples, the device manager is to cause the shared playback device to unjoin the second bonded zone.

In some examples, the adjuster is to cause a change to a second audio parameter of the second playback device in accordance with the unjoining of the shared playback device from the second bonded zone.

In some examples, the first playback device further includes an availability determiner to, in response to receiving a shared player request at the first playback device indicating that the shared playback device is requested to join the second bonded zone, determine that the shared playback device is available to unjoin the first bonded zone, wherein the device manager is to remove the shared playback device from the first bonded zone, and the adjuster is to change the first audio parameter of the first playback device in accordance with the unjoining of the shared playback device from the first bonded zone.

In some examples, the availability determiner is to determine whether the shared playback device is available to unjoin the first bonded zone by determining whether the first bonded zone is currently presenting media.

In some examples, the availability determiner is to determine whether the shared playback device is available to unjoin the first bonded zone by determining whether the first bonded zone has presented media within a threshold amount of time.

In some examples, the availability determiner is to determine whether the shared playback device is available to unjoin the first bonded zone by identifying a sharing priority of the shared playback device between the first and second bonded zones.

In some examples, the first playback device further includes a data structure to maintain a first value for the first audio parameter for use when the shared playback device is joined to the first bonded zone, and maintain a second value for the first audio parameter for use when the shared playback device is not joined to the first bonded zone.

In some examples, the shared playback device is a subwoofer.

In some examples, the first playback device further includes an interpreter to identify data received at the first playback device as a playback trigger, wherein the device manager is to cause the shared playback device to join the first bonded zone in response to the playback trigger.

In some examples, the playback trigger comprises a play command or an audio input detection.

In another aspect, a non-transitory computer readable memory of a first playback device is provided, the memory having stored thereon instructions executable by a computing device to cause the computing device to perform operations. The operations include identifying a shared playback device as sharable between a first bonded zone and a second bonded zone, the first bonded zone comprising the first playback device, the second bonded zone comprising a second playback device; causing the shared playback device to join the first bonded zone; and adjusting a first audio parameter of the first playback device in accordance with the joining of the shared playback device in the first bonded zone.

In some examples, the operations further include causing the shared playback device to unjoin the second bonded zone.

In some examples, the operations further include causing an adjustment to a second audio parameter of the second playback device in accordance with the unjoining of the shared playback device from the second bonded zone.

In some examples, the operations further include, in response to receiving a shared player request at the first playback device indicating that the shared playback device is requested to join the second bonded zone: determining whether the second playback device is available to unjoin the first bonded zone; removing the shared playback device from the first bonded zone; and adjusting the first audio parameter of the first playback device in accordance with the unjoining of the shared playback device from the first bonded zone.

In some examples, the operations further include determining whether the shard playback device is available to unjoin the first bonded zone by determining whether the first bonded zone is currently presenting media.

In some examples, the operations further include determining whether the shared playback device is available to unjoin the first bonded zone by determining whether the first bonded zone has presented media within a threshold amount of time.

In some examples, the operations further include determining whether the shared playback device is available to unjoin the second bonded zone by identifying a sharing priority of the shared playback device between the first and second bonded zones.

In some examples, the operations further include maintaining a first value for the first audio parameter for use when the shared playback device is joined to the first bonded zone, and maintaining a second value for the first audio parameter for use when the shared playback device is not joined to the first bonded zone.

In some examples, the shared playback device comprises a subwoofer.

In some examples, the causing of the shared playback device to join the first bonded zone is in response to identifying data received at the first playback device as a playback trigger.

In some examples, the playback trigger comprises a play command or an audio input detection.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A first playback device comprising:
   at least one processor;
   non-transitory computer-readable medium; and
   program instructions stored on the non-transitory computer-readable medium that are executable by the at least one processor and thereby cause the first playback device to be configured to:
     receive an instruction to share a playback device between (i) a first group of playback devices that includes at least the first playback device and (ii) a second group of playback devices that includes at least a second playback device;
     receive a command for the first playback device to play back given media content;
     determine that the shared playback device is currently configured for synchronous playback of media content in the second group of playback device;
     based on the received command, transmit a request to the second playback device for an indication of whether the shared playback device is available to join the first group of playback devices such that the shared playback device is configured for synchronous playback of media content with the first group of playback devices;
     if the first playback device receives an indication from the second playback device that the shared playback device is available:
       transmit a command to the shared playback device to join the first group of playback devices; and
       play back the given media content in synchrony with the first group of playback devices including at least the shared playback device; and
     if the first playback device receives an indication from second playback device that the shared playback device is unavailable, play back the given media content without synchronizing playback of the given media content with the shared playback device.

2. The first playback device of claim 1, wherein the program instructions that are executable by the at least one processor and thereby cause the first playback device to be configured to determine that the shared playback device is currently configured for synchronous playback of media content in the second group of playback devices comprise program instructions that are executable by the at least one processor and thereby cause the first playback device to be configured to, based on the received command,
   determine that the shared playback device is currently configured for synchronous playback of media content in the second group of playback devices.

3. The first playback device of claim 1, wherein the program instructions that are executable by the at least one processor and thereby cause the first playback device to be configured to transmit the command to the shared playback device to join the first group of playback devices comprise program instructions that are executable by the at least one processor and thereby cause the first playback device to be configured to transmit a command to the shared playback device to update a playback configuration of the shared playback device.

4. The first playback device of claim 3, further comprising program instructions stored on the non-transitory computer-readable medium that are executable by the at least one processor and thereby cause the first playback device to be configured to:
   before playing back the given media content in synchrony with the first group of playback devices including at least the shared playback device, update a playback configuration of the first playback device.

5. The first playback device of claim 4, wherein the program instructions that are executable by the at least one processor and thereby cause the first playback device to be configured to update the playback configuration of the first playback device comprise program instructions that are executable by the at least one processor and thereby cause the first playback device to be configured to play back a given subset of a plurality of audio channels included in the given media content, and wherein the program instructions that are executable by the at least one processor and thereby cause the first playback device to be configured to play back the given media content in synchrony with the first group of playback devices including at least the shared playback device comprise program instructions that are executable by the at least one processor and thereby cause the first playback device to be configured to play back the given subset of the plurality of audio channels included in the given media content.

6. The first playback device of claim 4, further comprising program instructions stored on the non-transitory computer-readable medium that are executable by the at least one processor and thereby cause the first playback device to be configured to:
   transmit a command to at least one other device in the first group of playback devices to update a playback configuration of the at least one other device.

7. The first playback device of claim 1, further comprising program instructions stored on the non-transitory computer-readable medium that are executable by the at least one processor and thereby cause the first playback device to be configured to:
   after transmitting the command to the shared playback device to join the first group of playback devices, update, in memory of the first playback device, a network state identifier that indicates a grouping status of at least the first playback device and the shared playback device.

8. The first playback device of claim 1, wherein the program instructions that are executable by the at least one processor and thereby cause the first playback device to be configured to receive the command for the first playback device to play back given media content comprise program instructions that are executable by the at least one processor and thereby cause the first playback device to be configured to detect an audio input from a media presentation device.

9. The first playback device of claim 1, further comprising program instructions stored on the non-transitory computer-readable medium that are executable by the at least one processor and thereby cause the first playback device to be configured to:
provide an indication to a controller device for presentation on a graphical display that indicates the shared playback device has joined the first group of playback devices.

10. A non-transitory computer-readable medium, wherein the non-transitory computer-readable medium is provisioned with program instructions that, when executed by at least one processor, cause a first playback device to:
receive an instruction to share a playback device between (i) a first group of playback devices that includes at least the first playback device and (ii) a second group of playback devices that includes at least a second playback device;
receive a command for the first playback device to play back given media content;
determine that the shared playback device is currently configured for synchronous playback of media content in the second group of playback device;
based on the received command, transmit a request to the second playback device for an indication of whether shared playback device is available to join the first group of playback devices such that the shared playback device is configured for synchronous playback of media content with the first group of playback devices;
if the first playback device receives an indication from the second playback device that the shared playback device is available:
transmit a command to the shared playback device to join the first group of playback devices; and
play back the given media content in synchrony with the first group of playback devices including at least the shared playback device; and
if the first playback device receives an indication from second playback device that the shared playback device is unavailable, play back the given media content without synchronizing playback of the given media content with the shared playback device.

11. The non-transitory computer-readable medium of claim 10, wherein the program instructions that, when executed by the at least one processor, cause the first playback device to: determine that the shared playback device is currently configured for synchronous playback of media content in the second group of playback devices comprise program instructions that, when executed by the at least one processor, cause the first playback device to, based on the received command,
determine that the shared playback device is currently configured for synchronous playback of media content in the second group of playback devices.

12. The non-transitory computer-readable medium of claim 10, wherein the program instructions that, when executed by the at least one processor, cause the first playback device to transmit the command to the shared playback device to join the first group of playback devices comprise program instructions that, when executed by the at least one processor, cause the first playback device to transmit a command to the shared playback device to update a playback configuration of the shared playback device.

13. The non-transitory computer-readable medium of claim 12, wherein the non-transitory computer-readable medium is also provisioned with program instructions that, when executed by the at least one processor, cause the first playback device to:
before playing back the given media content in synchrony with the first group of playback devices including at least the shared playback device, update a playback configuration of the first playback device.

14. The non-transitory computer-readable medium of claim 13, wherein the program instructions that, when executed by the at least one processor, cause the first playback device to update the playback configuration of the first playback device comprise program instructions that, when executed by the at least one processor, cause the first playback device to play back a given subset of a plurality of audio channels included in the given media content, and wherein the program instructions that, when executed by the at least one processor, cause the first playback device to play back the given media content in synchrony with the first group of playback devices including at least the shared playback device comprise program instructions that, when executed by me at least one processor, cause the first playback device to play back the given subset of the plurality of audio channels included in the given media content.

15. The non-transitory computer-readable medium of claim 13, wherein the non-transitory computer-readable medium is also provisioned with program instructions that, when executed by the at least one processor, cause the first playback device to:
transmit a command to at least one other device in the first group of playback devices to update a playback configuration of the at least one other device.

16. The non-transitory computer-readable medium of claim 10, wherein the non-transitory computer-readable medium is also provisioned with program instructions that when executed by the at least one processor, cause the first playback device to:
after transmitting the command to the shared playback device to join the first group of playback devices, update, in memory of the first playback device, a network state identifier that indicates a grouping status of at least the first playback device and the shared playback device.

17. The non-transitory computer-readable medium of claim 10, wherein the program instructions that, when executed by the at least one processor, cause the first playback device to receive the command for the first playback device to play back given media content comprise program instructions that, when executed by the at least one processor, cause the first playback device to detect an audio input from a media presentation device.

18. The non-transitory computer-readable medium of claim 10, wherein the non-transitory computer-readable medium is also provisioned with program instructions that, when executed by the at least one processor, cause the first playback device to:
provide an indication to a controller device for presentation on a graphical display that indicates the shared playback device has joined the first group of playback devices.

19. A method carried out by a first playback device, the method comprising:
receive an instruction to share a playback device between (i) a first group of playback devices that includes at least the first playback device and (ii) a second group of playback devices that includes at least a second playback device;

receiving a command for the first playback device to play back given media content;

determine that the shared playback device is currently configured for synchronous playback of media content in the second group of playback device;

based on the received command, transmitting a request to the second playback device for an indication of whether the shared playback device is available to join the first group of playback devices such that the shared playback device is configured for synchronous playback of media content with the first group of playback devices;

if the first playback device receives an indication from second playback device that the shared playback device is available:
- transmitting a command to the shared playback device to join the first group of playback devices; and
- playing back the given media content in synchrony with the first group of playback devices including at least the shared playback device; and if the first playback device receives an indication from second playback device that the shared playback device is unavailable, playing back the given media content without synchronizing playback of the given media content with the shared playback device.

20. The method of claim 19, wherein receiving the command for the first playback device to play back given media content comprises detecting an audio input from a media presentation device.

* * * * *